United States Patent
Zhang

(10) Patent No.: US 11,941,782 B2
(45) Date of Patent: Mar. 26, 2024

(54) GPU-BASED LENS BLUR RENDERING USING DEPTH MAPS

(71) Applicant: Adobe Inc., San Jose, CA (US)

(72) Inventor: Zhengyun Zhang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 72 days.

(21) Appl. No.: 16/903,120

(22) Filed: Jun. 16, 2020

(65) Prior Publication Data

US 2021/0390665 A1 Dec. 16, 2021

(51) Int. Cl.
*G06T 5/00* (2006.01)
*G06T 15/00* (2011.01)

(52) U.S. Cl.
CPC ............ *G06T 5/002* (2013.01); *G06T 15/005* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 11,189,002 | B1 * | 11/2021 | Nikitenko | ............ G06T 15/005 |
| 2008/0303894 | A1 * | 12/2008 | Ernst | ............ G06T 7/571 |
| | | | | 348/E13.001 |
| 2015/0178970 | A1 * | 6/2015 | Pham | ............ G06T 5/002 |
| | | | | 382/190 |
| 2019/0347771 | A1 * | 11/2019 | Suszek | ............ G06T 3/40 |
| 2021/0183088 | A1 * | 6/2021 | Gallo | ............ G06N 3/04 |

OTHER PUBLICATIONS

Nehab, Diego, et al. "GPU-efficient recursive filtering and summed-area tables." ACM Transactions on Graphics (TOG) 30.6 (2011): 1-12. (Year: 2011).*

C.-T. Huang, Y.-W. Wang, L.-R. Huang, J. Chin and L.-G. Chen, "Fast Physically Correct Refocusing for Sparse Light Fields Using Block-Based Multi-Rate View Interpolation," in IEEE Transactions on Image Processing, vol. 26, No. 2, pp. 603-618, Feb. 2017, doi: 10.1109/TIP.2016.2631904. (Year: 2017).*

Catlike Coding: Unity Tutorial, Advanced Rendering, Depth of Field, Feb. 28, 2018, 44 pages, https://catlikecoding.com/unity/tutorials/advanced-rendering/depth-of-field/.

Liemkuhler et al., Laplacian Kernel Splatting for Efficient Depth-of-field and Motion Blur Synthesis or Reconstruction, ACM Trans. Graph. 37, 4, Article 55 (Aug. 2018), 11 pages, https://doi.org/10.1145/3197517.3201379.

* cited by examiner

*Primary Examiner* — Andrae S Allison
(74) *Attorney, Agent, or Firm* — Nicholson De Vos Webster & Elliott LLP

(57) ABSTRACT

Embodiments are disclosed for adding lens blur effects to input images. In particular, in one or more embodiments, the disclosed systems and methods comprise receiving a request to apply a lens blur effect to an image an accumulation region of the input image corresponding to a first pixel of an output image, determining a weight for each of the one or more source pixels based at least in part on an iris map for the one or more source pixels and a depth distance value between each of the one or more source pixels and the focal plane, and generating an output pixel value for the first pixel by calculating a weighted sum of the one or more source pixels from the accumulation region.

16 Claims, 14 Drawing Sheets

GPU-BASED LENS BLUR RENDERING USING DEPTH MAPS

BACKGROUND

1. Technical Field

The present disclosure relates generally to systems and method for image enhancement. More specifically, one or more embodiments of the present disclosure relate to systems and methods that add image blur effects to images.

2. Background and Relevant Art

Recent years have seen a rapid proliferation in the use of digital media, such as digital photography and computer-generated imagery. The use of digital media enables a user to edit or otherwise customize a digital image for a particular purpose. This includes applying various post-processing effects digital images such as smoothing, sharpening, blurring, and deblurring. One such effect, lens blurring, attempts to emulate the visual effect of the out-of-focus parts of an image produced by a lens. The aesthetic quality of the out-of-focus portions of an image is referred to as bokeh. The aperture size, aperture shape, and lens characteristics, such as lens aberrations, all affect the bokeh produced by a lens. Applying a realistic and visually pleasing lens blur effect to a digital image based on limited data associated with the digital image is challenging.

Lens blur effects as implemented in existing digital image editing systems suffer from various problems which reduce the realism or aesthetics of the resulting effects. For example, objects in focus occlude nearby objects in front of them, blending is performed directly on gamma-encoded values, and boosting of bright areas in the image is only monochromatic. This results in unnaturally sharp edges on objects in front of the focal plane, dull bokeh highlights, and bright areas of the image (e.g., small bright lights at night) lose their color when they are boosted.

Other systems partition the blur computation across portions of the aperture itself, such as randomly sampling camera aperture and performing simplified ray casting. This results in inefficient access patterns in texture memory and requires sufficient oversampling to obtain sharp and uniform bokehs, leading to slow rendering speeds. Other techniques improve rendering speeds but result in bleed-through across depth discontinuities.

These and other problems exist with regard to adding lens blur effects in digital visual media.

BRIEF SUMMARY

Introduced here are techniques/technologies that apply lens blur effects to input images based on user provided blur parameters. In particular, in one or more embodiments, the disclosed systems and methods receiving a request to apply a lens blur effect to an image based on lens blur parameters. The output image is divided into pixel blocks which are processed in parallel. For each pixel in each pixel block, an accumulation region from the input image is identified. The output pixel value for each pixel in each pixel block is a weighted sum of source pixel values from the accumulation region. The weight of each source pixel is determined based on a depth distance between the focal plane and the source pixel from the input image and a difference in depth values of the output pixel and the source pixel.

More specifically, in one or more embodiments, the systems and methods parallelize lens blur processing across a plurality of threadgroups of a graphics processing unit (GPU). Each threadgroup processes a different pixel block, with each thread of the threadgroup processing one or more output pixels of its assigned pixel block. For each output pixel, an accumulation region centered on the coordinates of the output pixel is identified in the input image. This accumulation region includes pixels which potentially contribute to the output pixel value. The source pixels that do contribute is identify based on a difference between their relative distances from the focal plane and the distance of the output pixel to the focal plane. The source pixels are weighted based on their distance to the focal plane and the output pixel value is calculated based on a weighted sum of the source pixels from the accumulation region.

Additional features and advantages of exemplary embodiments of the present disclosure are set forth in the description which follows, and in part are obvious from the description, or are learned by the practice of such exemplary embodiments.

BRIEF DESCRIPTION OF THE DRAWINGS

The detailed description is described with reference to the accompanying drawings in which.

DETAILED DESCRIPTION

Figure 1:
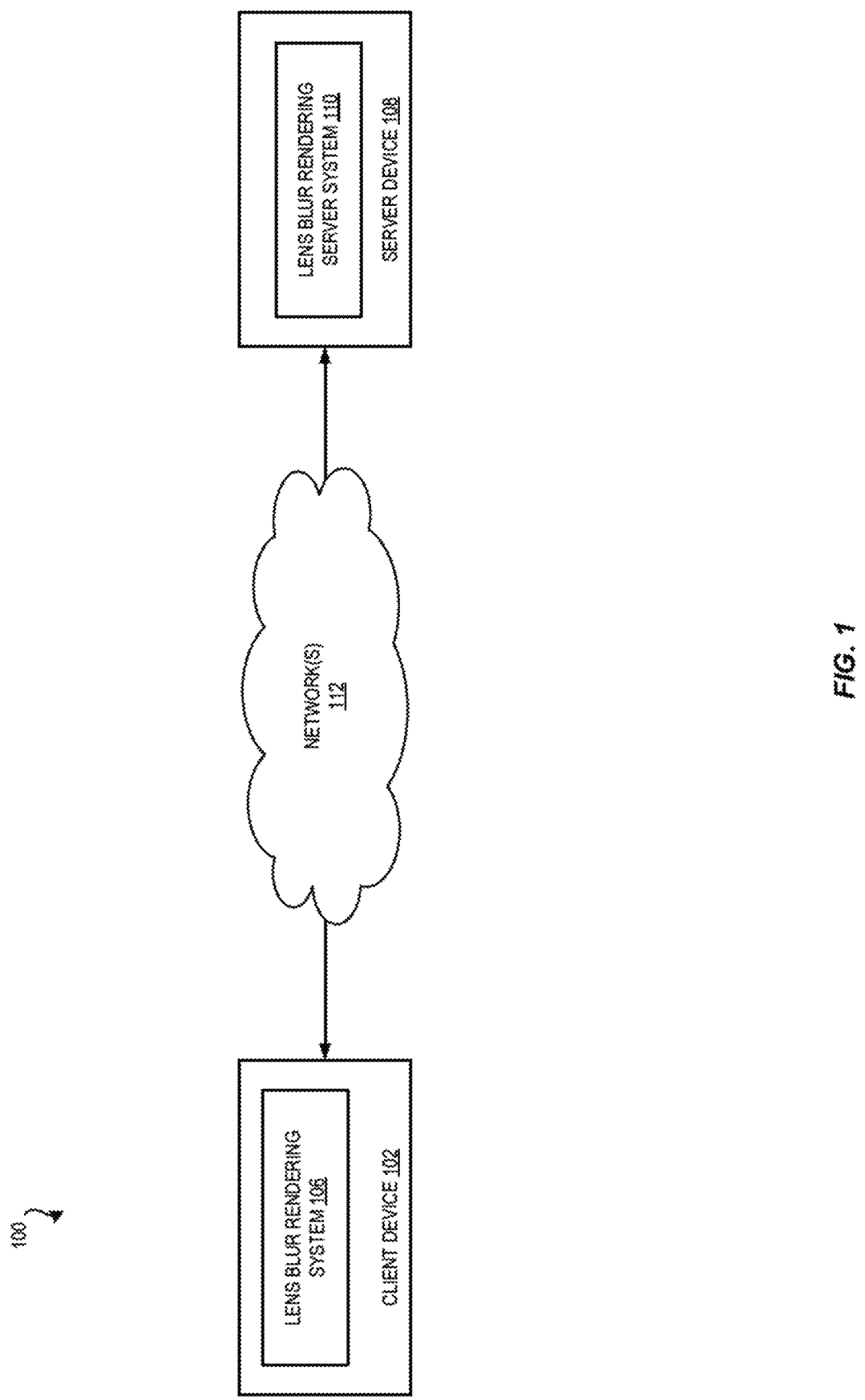
FIG. 1 illustrates an example environment in which lens blur rendering is performed in accordance with one or more embodiments.

One or more embodiments of the present disclosure include a lens blur rendering system that adds lens blur effects to input images based on a corresponding depth map. For example, lens blur is added to blur out portions of an input images corresponding to representations of areas that are in front of or behind an area of interest. The lens blur rendering system receives an input image to which the blur effect is to be added, and a corresponding depth map. In some embodiments, the depth map indicates, for each pixel in the image, a distance for that pixel from a reference viewpoint (e.g., the camera). Alternatively, the depth map is a disparity map, which determines relative depth information of pixels to one another based on observed parallax from moving the camera or from an image captured simultaneously by two cameras at known positions. In addition to the image and corresponding depth map, the user specifies a distance of interest, corresponding to a depth value, or range of depth values, of the portion or portions of the image which are to be in focus.

Using the input image, depth map, and distance of interest, embodiments heuristically calculate an output pixel value for each output pixel that adds the blur effect to the output image. In accordance with an embodiment, rendering of the blur effect is performed using one or more graphics processing units (GPUs), accelerator processing units (APUs), or other accelerator. By using a GPU, the rendering operations are parallelized, improving rendering performance.

Embodiments calculate the output pixel values based on an accumulation region of input pixels. The accumulation region is centered on the coordinates of the output pixel and includes pixels whose values possibly contribute to the output pixel value. Properly determining which input pixel values contribute to an output pixel value is important to generate a realistic blur effect. Embodiments use the depth map to determine whether an input pixel contributes to an output pixel by comparing the input pixel's depth and the output pixel's depth. The smaller depth value (e.g., the closer depth value) is then used to calculate an effective blur radius. The effective blur radius is calculated by determining the absolute difference between the smaller depth value and the distance of interest and scaling the result by a user selected blur radius. By using the smaller depth value, background pixels do not leak through foreground pixels and additionally this does not result in artifacts around the edges of foreground objects. This further enables the lens blur rendering system to determine whether the source pixel's contribution is seen from the reference viewpoint (e.g., the camera) without requiring ray tracing.

Prior techniques determined whether a given input pixel contributes to an output pixel differently. For example, in some prior techniques, an effective blur radius is computed for both the input pixel and the output pixel. The smaller of the two effective blur radii is then used to determine whether the input pixel contributes to the output pixel. Although this prevents background pixels from bleeding over foreground pixels, it also creates artifacts around representations of foreground objects (e.g., unnaturally sharp edges) which results in an unrealistic blur effect. Embodiments overcome this deficiency by using the smaller depth value to calculate the effective blur radius which eliminates the foreground artifacts and results in more realistic blur effects.

Term Definitions

As used herein, the term "digital visual media" refers to digital data capable of producing a visual representation. For instance, the term "digital visual media" includes digital images and digital video.

As used herein, the term "digital image" or "image" refers to any digital symbol, picture, icon, or illustration. For example, the term "digital image" includes, but is not limited to, digital files with the following file extensions: JPG, TIFF, BMP, PNG, RAW, or PDF. Thus, a digital image includes digital data or a digital file for an image that is displayable via a graphical user interface of a display of a computing device.

As used herein, the term "digital video" or "video" refers to digital data representative of a sequence of visual images (e.g., frames). By way of example, the term "digital video" includes, but is not limited to, a digital file having one of the following file extensions: AVI, FLV, WMV, MOV, MP4. Thus, a digital video includes digital data or a digital file for a video that is displayable via a graphical user interface of a display of a computing device.

As used herein, the term "depth map" refers to a digital image or a channel of a digital image that includes depth data for each pixel of a corresponding digital image. For example, the value of each pixel of a depth map indicates a depth of that pixel from a reference viewpoint. In some embodiments, the depth map is a "disparity map" in which each pixel value of the depth map indicates a relative depth of that pixel as compared to other pixels in the depth map.

As used herein, the term "lens blur" refers to the effect of defocus on portions of a digital image. Various camera attributes contribute to a lens blur when an image is captured. For example, the camera's focal length, aperture, f-number, distance to subject, etc. all determine which portions of a given digital image are in focus and which portions are out of focus (e.g., the depth of field).

As used herein, the term "lens blur effect" refers to the application of lens blur to digital visual media be applied to digital visual media to change the depth of field of the digital visual media. For example, a digital image includes representations of objects at multiple depths. If the digital image has a deep enough depth of field, the representations of all of the objects appear in focus, whereas if the digital image has a shallower depth of field some or none of the objects appear in focus, depending on their placement relative to the camera. A lens blur effect added to a digital image adds lens blur selectively to portions of the digital image based on input parameters, such as distance of interest which is to be in focus, a blur radius, etc.

As used herein, the term "blur radius" refers to the radius of a region of input pixels that are used to calculate the blur effect of an output pixel. The larger the region of input pixels used to calculate the blur effect for an output pixel, the larger the observed blur in the resulting blur effect. For example, in some embodiments the blur radius is measured in pixels and varies between 0 (no blur effect) to a maximum blur radius (the maximum blur effect).

As used herein, the term "accumulation region" refers to the region of input pixels that are used to calculate the blur effect to be applied to an output pixel. As discussed, the size of the accumulation region is determined by the blur radius, described above. The accumulation region is a square region of input pixels centered on the coordinates of the output pixel. Each side of the accumulation region has a length equal to twice the blur radius in pixels plus one and so varies in size between a single pixel (e.g., where the blur radius is 0) and twice the maximum blur radius plus one (where the blur radius is the maximum blur radius).

As used herein, the term "iris map" refers to a set of iris threshold values calculated for each pixel of a digital image. The iris threshold values are calculated based on the iris shape and a distance between a coordinate of a given source pixel and a coordinate of the output pixel. The iris threshold represents a minimum blur value for a given source pixel to contribute to the output value. As discussed further below, the iris map is used while processing an accumulation region to identify which pixels in the accumulation region contribute to the output pixel value corresponding to the accumulation region.

FIG. 1 illustrates an example environment in which lens blur rendering is performed in accordance with one or more embodiments. As illustrated in FIG. 1, the environment 100 includes the client device 102 having lens blur rendering system 104. The lens blur rendering system 104 generally facilitates the creation, modification, sharing, and/or deletion of graphical content including raster-based content. In one or more embodiments, the lens blur rendering system 104 is a design application such as ADOBE® PHOTOSHOP®. In other embodiments, the lens blur rendering system 104 includes multiple applications, functions, and operations relating to graphical content, such as an application suite, a web-based application, and/or system operations on the client device 102.

In addition, the environment 100 includes the server device 108. The server device 108 generates, stores, receives, and/or transmits any type of data, including digital visual media. As shown, the server device 108 includes a lens blur rendering server system 110 that communicates with the lens blur rendering system 104 on the client device 102. For example, the lens blur rendering server system 110 transmits digital visual media to the client device 102, which enables the client device 102 to add blur effects to the digital visual media. Notably, while only a single server device is shown, in some embodiments, the lens blur rendering server system 110 is implemented across multiple server devices.

While not illustrated, in one or more embodiments, the server device 108 includes all, or a portion of, the lens blur rendering system 104, such as within the lens blur rendering server system 110. For example, when located in the server device 108, the lens blur rendering system 104 comprises an application running on the server device 108 or a portion of a software application that is downloadable to the client device 102. For instance, the lens blur rendering system 104 includes a web hosting application that allows the client device 102 to interact with content from the lens blur rendering server system 110 hosted at the server device 108. In this manner, in some embodiments, the server device 108 adds blur effects to digital visual media based on inputs received from a designer using client device 102.

Figure 2:
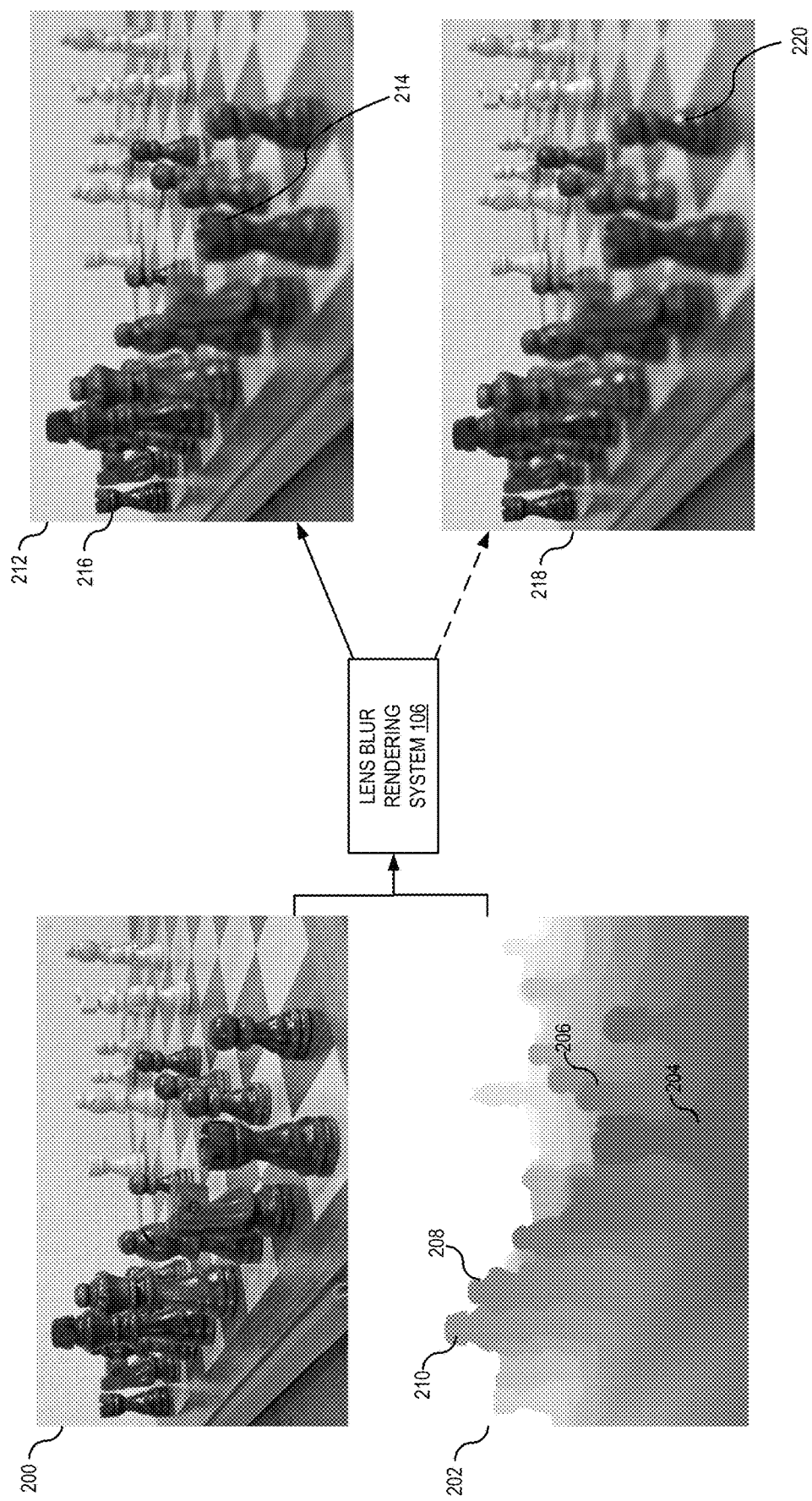
FIG. 2 illustrates example lens blur effects applied to an example input image and depth map in accordance with one or more embodiments.

FIG. 2 illustrates example lens blur effects applied to an example input image and depth map in accordance with one or more embodiments As shown in FIG. 2, an input image 200 includes visual representations of various objects which are depicted at different depths relative to the camera's point of view. Although the input image 200 shows a digital image, the input image comprises any type of digital visual media. As discussed, the term "digital visual media" refers to digital data capable of producing a visual representation. For instance, the term "digital visual media" includes digital images and digital video. As used herein, the term "digital image" refers to any digital symbol, picture, icon, or illustration. For example, the term "digital image" includes, but is not limited to, digital files with the following file extensions: JPG, TIFF, BMP, PNG, RAW, or PDF. Accordingly, although FIG. 2 illustrates the input image 202 as a digital image, the lens blur rendering system is also capable of adding blur effects to various other types of digital visual media.

A given camera has a depth of field based on the focal length, aperture, circle of confusion and distance to subject. As shown in FIG. 2, the input image includes representations of chess pieces on a chessboard. The depth of field is a measure of the distance between objects that are in focus. In the example input image 200 of FIG. 2, the chess pieces and chessboard fall within the camera's depth of field as they are all in focus. Adding lens blur in post-processing to an input image enables a user to provide the effect of a different depth of field than that of the camera that captured the input image. This is chosen for artistic or aesthetic purposes, to focus the viewer on a particular portion of the digital image, or other purposes.

As discussed above, adding lens blur that is realistic and aesthetically pleasing, as well as performant, is a non-trivial task. Embodiments use a depth map 202 corresponding to the input image 200, as shown in FIG. 2, to identify which source pixels from the input image 200 contribute to an output pixel of the post-processed image which has had the lens blur effect added. In some embodiments, depth map 202 is a channel of the input image 200 which includes depth data for each pixel of the digital image rather than color data. In some embodiments, the depth map 202 is maintained as a separate file. The depth data in the depth map indicates, for each pixel of the depth map, the distance of that pixel from a reference viewpoint (e.g., the camera). For example, in the depth map 202 of FIG. 2, darker pixels correspond to nearer objects and lighter pixels correspond to farther objects. As discussed, in some embodiments, the depth data represents the distance from a reference viewpoint (e.g., a camera) or, in alternative embodiments, the depth data represents relative depth data between the depicted objects.

In some embodiments, a depth map is created manually by a user selecting objects in an image and assigning those objects a depth. For example, the lens blur rendering system enables the user to select one or more portions of the image that include objects having the same depth and define a depth value for those portions of the image. The user continues selecting portions of the image and assigning depth values to those portions until the depth map for the image has been created. In some embodiments, a depth map is generated automatically by the camera when the image is captured. For example, in some embodiments, the camera uses one or more range imaging techniques, such as time-of-flight, stereo triangulation, or other techniques. In some embodiments, range data is obtained using other sensors in communication with the camera such as range finders, light detection and ranging (LiDAR) sensors, or other sensors. In some embodiments, a depth map is approximated by the lens blur rendering system based on the input image. For example, monocular depth cues, such as texture information or perspective, depth edge-aware algorithms, or other techniques. In some embodiments, the depth map is a disparity map which determines relative depth information of pixels to one another based on observed parallax from moving the camera or from an image captured simultaneously by two cameras at known positions.

Using the input image 200 and corresponding depth map 202, the lens blur rendering system 104 implements a heuristics-based lens blur technique to add lens blur to the input image based on a user-specified distance of interest. As discussed, past lens blur techniques suffer from a number of aesthetic and realistic shortcomings, for example objects in focus occlude nearby objects in front of them, blending is performed directly on gamma-encoded values, and boosting of bright areas in the image is only monochromatic, which leads to unnaturally sharp edges of objects in front of the focal plane, dull bokeh highlights, and loss of color in specular highlights. The lens blur rendering system addresses these shortcomings using improved rendering techniques.

As shown in FIG. 2, the darkest portion of the depth map, corresponding to objects in the nearest plane 204 to the camera, includes the rook and near portions of the chessboard. This is followed by a lighter plane 206 including a pawn, bishop, and farther portions of the chessboard, then the queen 208, king 210, and so on. As shown, the depth information of the pixels in the depth map is depicted as grayscale values, with near portions of the image being darker and far portions of the image being lighter. In various embodiments, the depth information is depicted using alternative color palettes. For example, different colors represent distance from the reference viewpoint, rather than grayscale values.

According to one or more embodiments, to prevent in-focus objects from occluding objects in front of them, the lens blur rendering system 104 uses a source pixel's depth information, from the depth map, to determine whether that source pixel contributes to an output pixel. This reduces the appearance of sharp boundaries around objects that are in front of the focal plane, without requiring ray tracing. For example, lens blur rendering system 104 adds lens blur effect to input image 200 to produce output image 212, where the lens blur effect is added to the portions of the input image that include representations of the nearest objects 214 to the reference viewpoint while keeping the portions of the image that include representations of the farthest objects 216 from the reference viewpoint in focus.

The lens blur rendering system 104 receives the input image 200, depth map 202, and a selection of the distance of interest (e.g., the depth value, or range of depth values, that correspond to the portion or portions of the image that are to be in focus). As shown in FIG. 2, this distance of interest corresponds to a depth value, or range of depth values, that corresponds to the portions of the image that include the far rooks, pawns, and bishops as shown at 216. In some embodiments, the distance is specified by selecting a portion of the image through a user interface (e.g., using a graphical selection tool), selecting a portion of the depth map, inputting the depth value corresponding to the distance or interest, etc. The lens blur rendering system then uses one or more GPUs to process the heuristic-based lens blur effect as discussed further below.

FIG. 2 further depicts an output image 218 which has been similarly blurred as output image 212, but with the addition of specular highlights. In some embodiments, specular highlights are an optional enhancement that are used to more realistically depict specular reflections which appear, e.g., on shiny objects such as shown at 220. A specular reflection appears as a fuzzy or otherwise distorted view of the light source. When such bright spots are blurred, to appear realistic, they generate brighter bokehs 220 than the areas around them. Because the light source that is causing the specular reflection is very bright, it saturates the camera sensor. As a result, the full brightness of these spots is typically not captured in the corresponding pixels of the image. As discussed further below, specular highlights are added using a quadratic approximation to approximate the actual brightness of saturated pixels in an image (including those that result from specular reflections or from other sources), compute the lens blur, and then reapply the saturation effect. This yields brighter, more realistic, bokehs.

Figure 3:
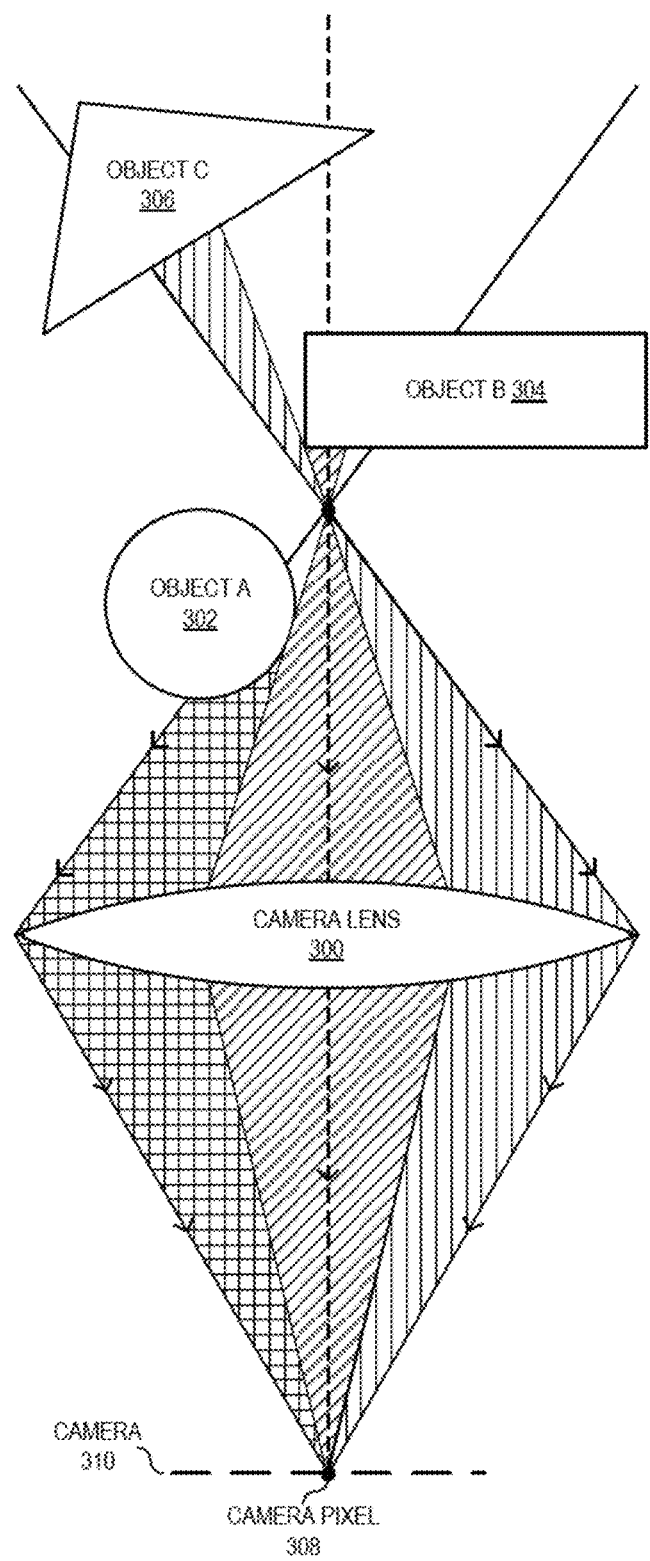
FIG. 3 illustrates a diagram of ideal lens blur rendering in accordance with one or more embodiments.

FIG. 3 illustrates a diagram of ideal lens blur rendering. In an ideal setting, lens blur is realistically applied to an image of a virtual scene in which data about the camera, including data about its lens 300 (such as lens abnormalities, focal length, iris shape, etc.) as well as each object 302-306 and their locations in the scene are known. Ray tracing is then used to trace all the rays in the virtual scene to each pixel 308 of a virtual camera 310. However, this is computationally expensive and in practice such a complete picture of the scene is not available. Instead, the data available to perform a realistic lens blur is much more limited.

Figure 4:
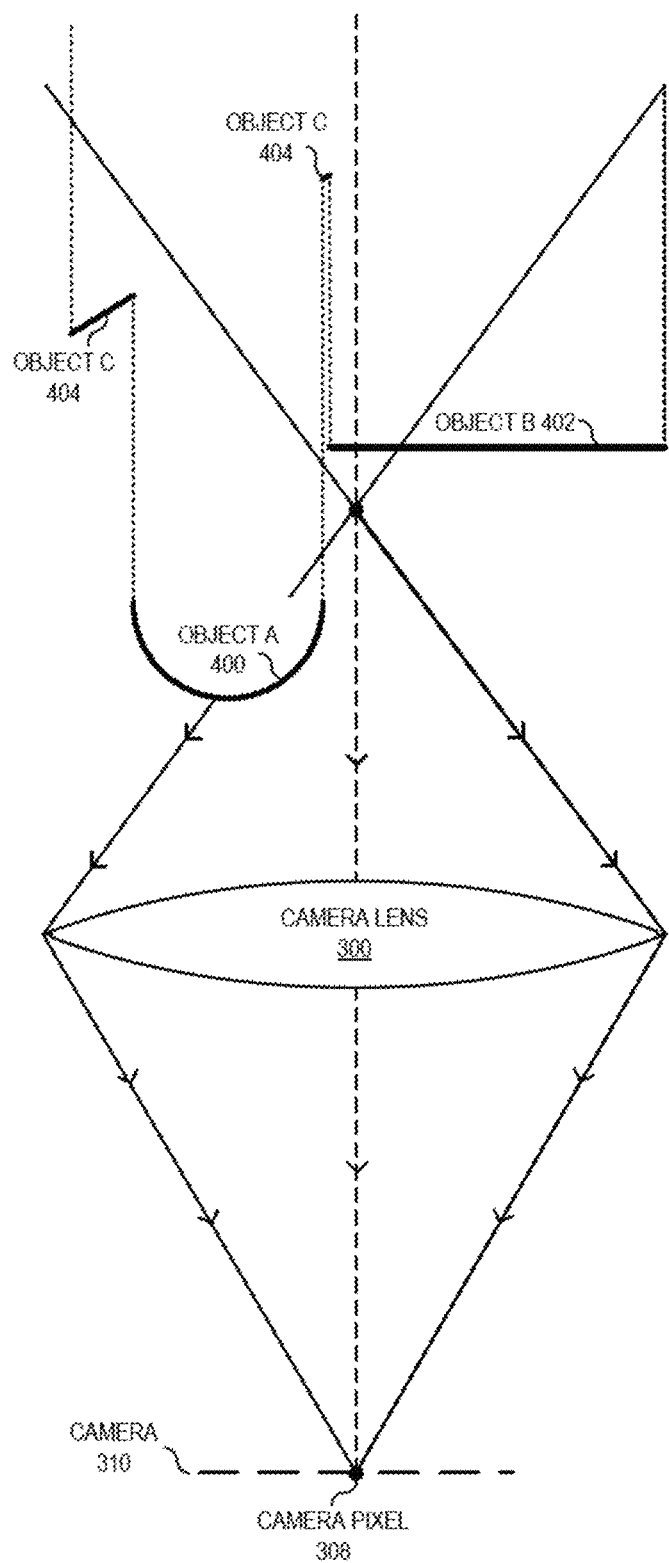
FIG. 4 illustrates a diagram of lens blur rendering accordance with one or more embodiments.

FIG. 4 illustrates a diagram of lens blur rendering accordance with one or more embodiments. As shown in FIG. 4, the data available in a given input image is typically much more limited. For example, using a corresponding depth map, the relative positions of objects A 400, B 402, and C 404 are determined in the input image. However, only the visible portions of those objects are known, without any three-dimensional characteristics of the objects as were shown in FIG. 3. Additionally, specific data about the camera which captured the input image is often not known. The techniques described herein enable realistic lens blur effects to be added using the limited information available in an input image.

Figure 5:
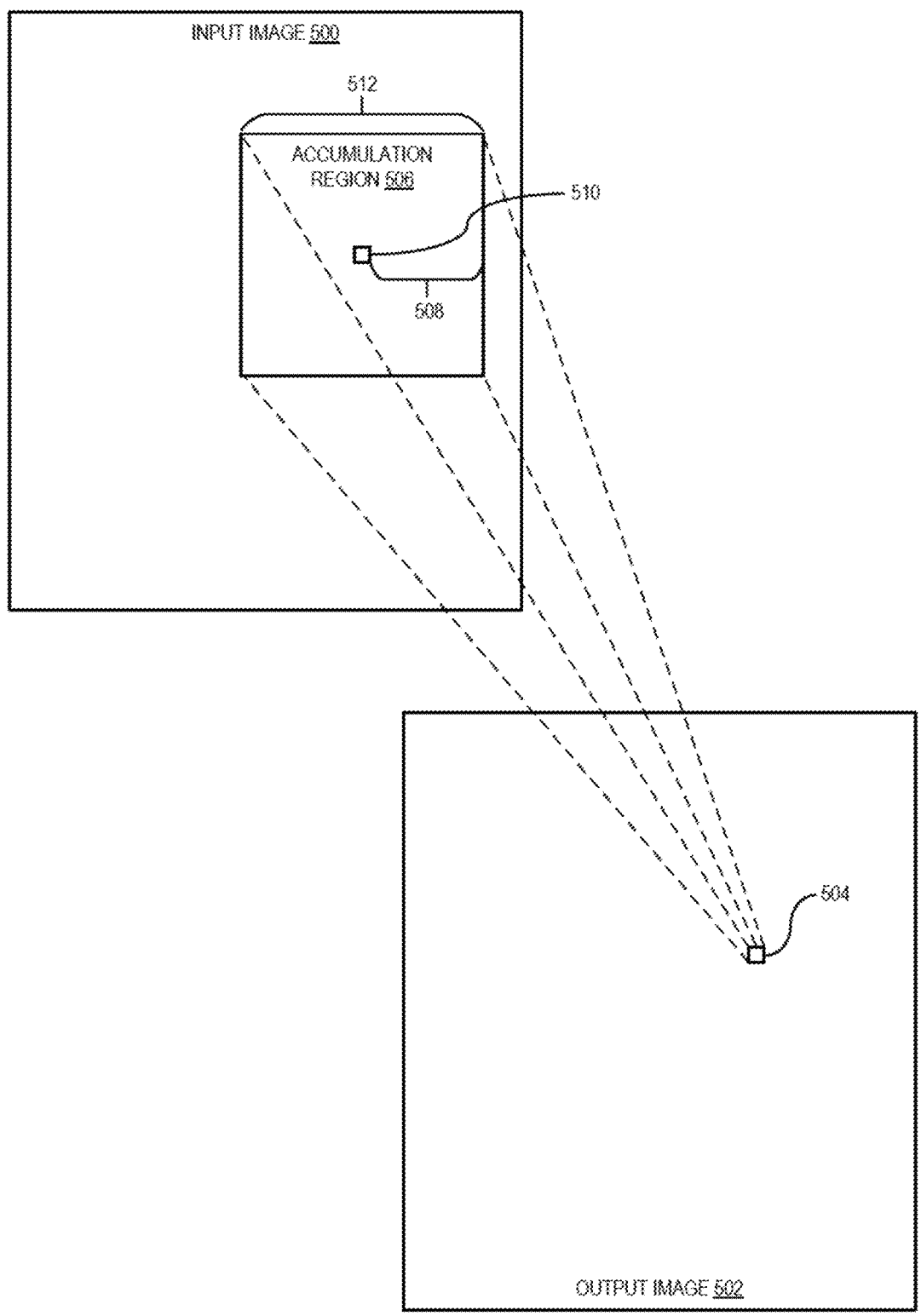
FIG. 5 illustrates an example of an accumulation region for an output pixel, in accordance with an embodiment.

FIG. 5 illustrates an example of an accumulation region for an output pixel, in accordance with an embodiment. For instance, to implement a blur effect to an input image 500, each output pixel of the output image 502, corresponds to a region of source pixels centered on the output pixel location. As shown in FIG. 5, a given output pixel 504 corresponds to an accumulation region 506 of source pixels which are used to compute that output pixel. The size of the accumulation region 506 is based on the blur radius used for the effect. As used herein, the "blur radius" refers to the number of pixels in the radius, r 508, of the accumulation region. The accumulation region is centered on the output pixel coordinate 510 in the input image, as such the accumulation region is a square having sides 512 measuring 2×r+1 pixels on each side. For example, if a blur radius of 15 pixels is used, then the accumulation region is 2×15+1=31 pixels on each side, centered on the coordinates of the output pixel.

In some embodiments, the blur radius is selected by the user through a user interface (e.g., by interacting with an icon or other user interface element of a graphical user interface, entering text into a text-based user interface, etc.). Additionally, or alternatively, the lens blur rendering system selects a default blur radius based on the distance of interest, the location of a selected region of the input image to remain in focus, etc. In some embodiments, this default blur radius is modified by the user via a user interface. The lens blur rendering system has a maximum blur radius which defines the largest region of source pixels that is used to compute an output pixel. For example, in some embodiments, a maximum blur radius is 63 pixels. In such an example, at the maximum blur radius, a region of 127 pixels by 127 pixels centered on the location of the output pixel is read from the source image to compute the output pixel.

Not all of the pixels in the accumulation region necessarily contribute to the output pixel value. For example, if there are no occlusions in the input image, then the blur radius is computed for an output pixel and it is compared to an iris threshold from an iris map for each source pixel of the accumulation region of the output pixel. Each pixel in the iris map includes the minimum blur radius required for the bokeh to extend to that pixel. As such, any pixels in the accumulation region where the blur radius is less than the minimum blur radius from the iris map do not contribute to the output pixel.

Additionally, the accumulation regions include pixels at different depths. To prevent artifacts at depth discontinuities, the lens blur rendering system first compares the depth value of the source pixel from the accumulation region with the depth value at the location of the output pixel and choose the depth that is closer to the camera. The lens blur rendering system then computes the effective blur radius using this depth value (e.g., absolute difference of the depth value and the focal depth, scaled by an amount based on the user's choice for maximally allowed blur radius). For example, objects closer to the focal plane are sharper than objects farther from the focal plane. As such, the size of the bokeh (e.g., a blurred region corresponding to a point of light in the input image), such as bokeh 220 shown above with respect to FIG. 2, is larger the farther those points are from the focal plane. When determining the depth value used to calculate the effective blur radius, the lens blur rendering system chooses the closer of the source pixel depth and the output pixel depth. Because the effective blur radius varies depending on depth, by choosing the closer of the source depth and the output location depth, the lens blur rendering system prevents background leakage while also preventing foreground clipping.

The contribution of pixels that are in the accumulation region and determined to contribute to the output pixel is weighted based on how close the pixels are to the output pixel. For example, the farther away a pixel is from the output pixel coordinate, the less of an effect it has on the output pixel. A standard inverse-square-law falloff is approximately $$\frac{1}{\pi \cdot r^2}$$

where r is the effective blur radius. If r=0 (e.g., at the focal plane), this number becomes infinitely large and is unrealistic because the pixels are not infinitely small but represent finite two-dimensional areas. To address this problem, a Lorentzian, $$\frac{1}{(1 + \pi \cdot r^2)},$$

is used to approximate the falloff. As such, the falloff approximates a standard inverse-square-law falloff away from the focal plane, and gradually converges to a value of 1 at the focal plane. As discussed further below, in some embodiments, this falloff varies depending on iris shape based on a scale factor.

Figure 6A:
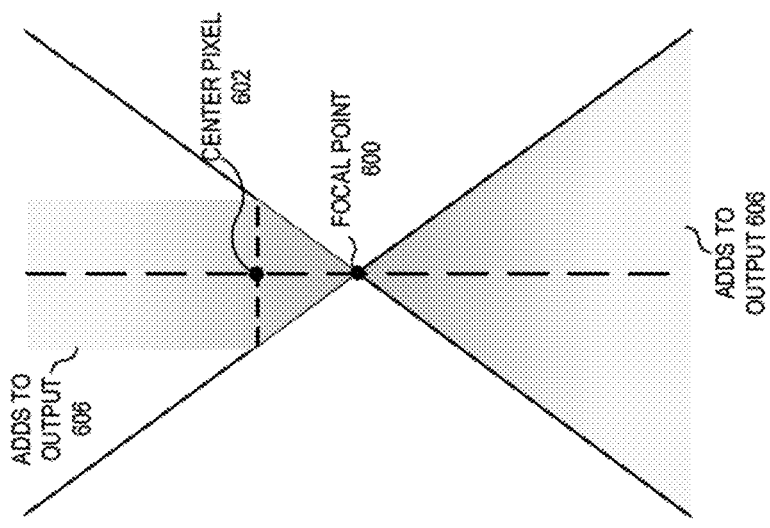
FIGS. 6A-6B illustrate changes to the effective blur kernel for bokehs where the center is behind the focal plane in accordance with one or more embodiments.
Figure 6B:
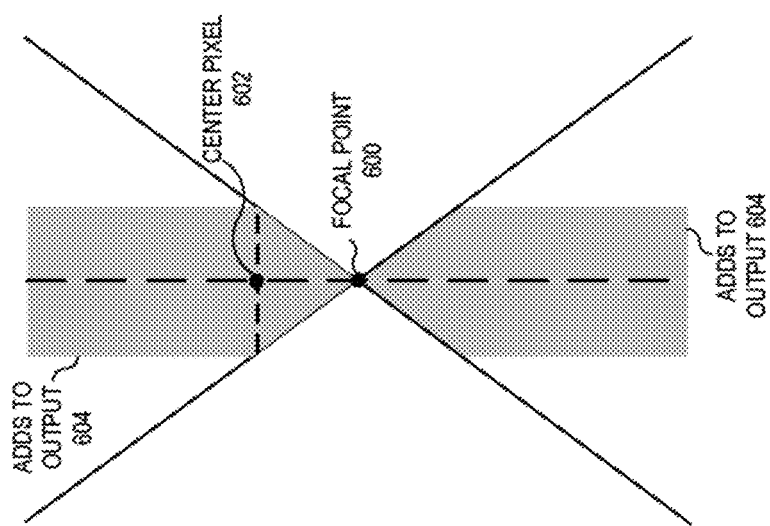

FIGS. 6A-6B illustrate changes to the effective blur kernel for bokehs where the center is behind the focal plane in accordance with one or more embodiments. As discussed above, techniques disclosed herein better identify which source pixels contribute to an output pixel, and how those source pixels contribute to the output pixel, to generate improved bokehs in lens blur effects. FIGS. 6A and 6B illustrate differences in the blur kernel between prior techniques and embodiments disclosed herein. In these examples, each diagram represents source pixels from an input image, where the horizontal location corresponds to a spatial (u,v) location of the source pixel and the vertical location represents the depth of the source pixel. As discussed, the coordinate of the output pixel for which a blur is being computed is the center pixel of the accumulation region of source pixels. In the example of FIGS. 6A and 6B, the center pixel 602 of this accumulation region is behind the focal plane which focal point 600 is on.

In the example shown in FIG. 6A, a prior technique for adding lens blur prevents source pixels located spatially far from the center pixel to be accumulated into the output. This is represented by shaded region 604. As shown in shaded region 604, pixels both in front and behind the center pixel 602 contribute to the output pixel. By excluding spatially distant pixels from contributing to the output, the possibility of background pixels bleeding through into a foreground object is reduced. However, this also results in reducing the contribution of pixels of objects in front of the center pixel 602 (e.g., by clipping the pixels to the left and right of the shaded region 604). As a result, objects in front of the center pixel 602 have unrealistically sharp boundaries. Additionally, as shown by the constant shade of shaded region 604, all of the pixels in this region contribute equally to the output, even those pixels that are distant in depth from the focal point.

In the example shown in FIG. 6B, embodiments improve lens blur rendering by reducing the contribution for pixels that are farther away from the focal plane and also pixels in front of the focal plane contributes to the output pixel. As shown in FIG. 6B, the shaded region is a gradient, with darker portions of the shaded region 606 closer to the focal plane. If the source pixel's location is within the shaded region 606, it contributes to the final result, with deeper shading indicating higher weight. By accumulating pixels in front of the center pixel 602 based on the effective blur radius described above, the edges of objects in front of the focal plane are blurrier, improving the appearance of the lens blur effect.

Figure 7B:
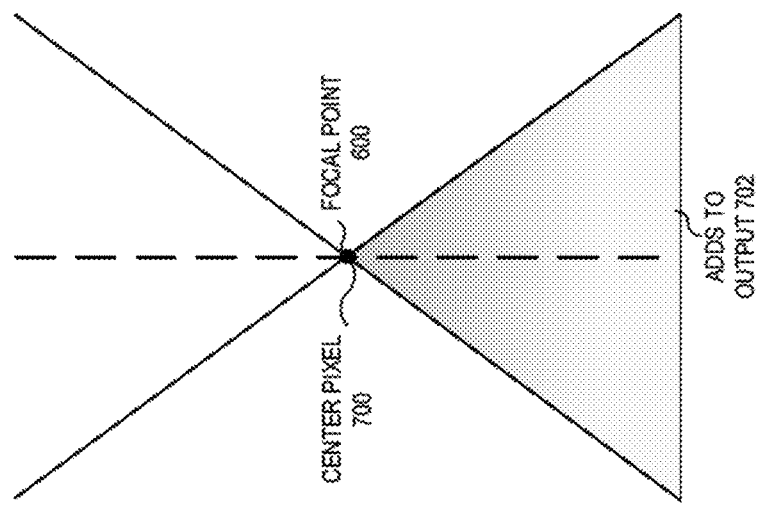
FIGS. 7A-7B illustrate changes to the effective blur kernel for bokehs where the center is at the focal plane in accordance with one or more embodiments.
Figure 7A:
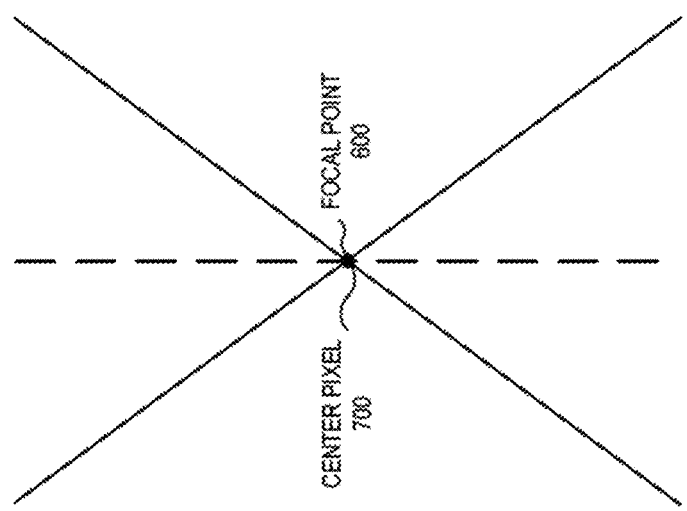

FIGS. 7A-7B illustrate changes to the effective blur kernel for bokehs where the center is at the focal plane in accordance with one or more embodiments. Similar to the example of FIGS. 6A-6B, in FIGS. 7A-7B, the center pixel 700 is located at the focal point 600. As shown in FIG. 7A, using prior techniques nothing in front of the center pixel contribute to the output pixel. As discussed above with respect to FIG. 6A, this failure to accumulate pixels of potentially occluding portions of the input image yields sharp edges for any objects depicted within these portions. However, in FIG. 7B, embodiments provide a more natural blur effect by accumulating pixels that are located in front of the focal plane. Similarly to FIG. 6B, the shaded region 702 is depicted as a gradient to indicate that darker regions (e.g., regions closer to the focal plane) have a higher weight when being accumulated, while lighter regions (e.g., regions farther from the focal plane) have a lower weight when being accumulated.

Figure 8B:
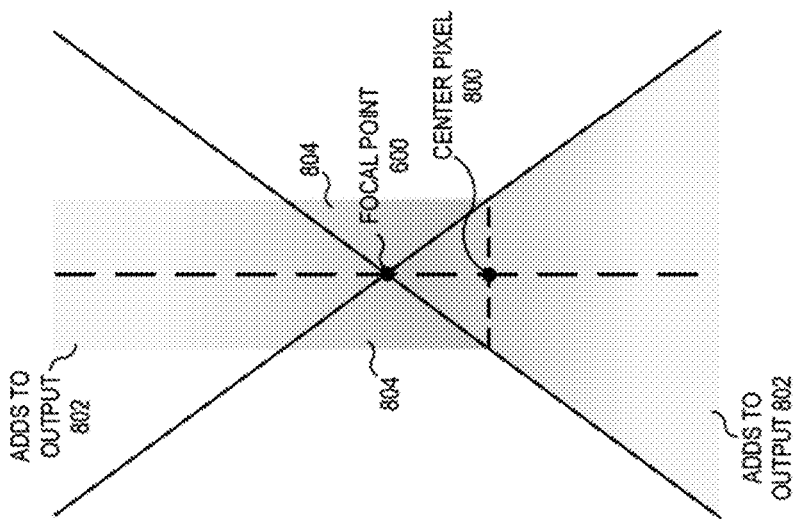
FIGS. 8A-8B illustrate changes to the effective blur kernel for bokehs where the center is in front of the focal plane in accordance with one or more embodiments.
Figure 8A:
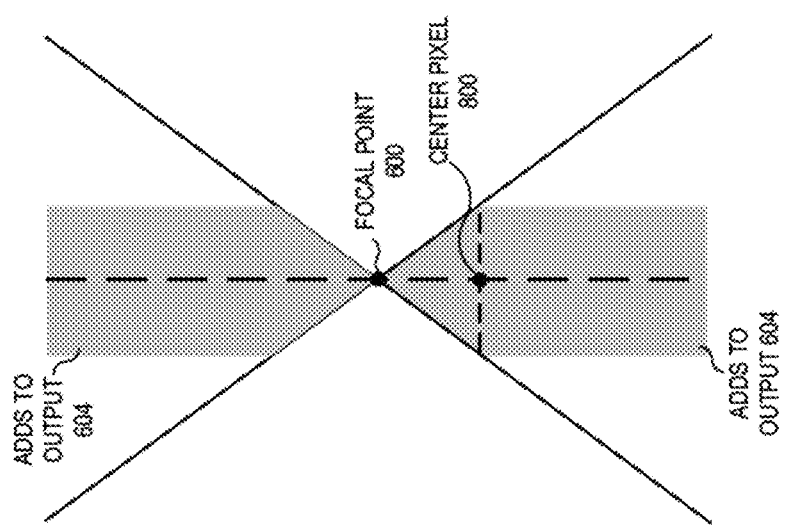

FIGS. 8A-8B illustrate changes to the effective blur kernel for bokehs where the center is in front of the focal plane in accordance with one or more embodiments. In the examples of FIGS. 8A-8B, the center pixel 800 is located in front of the focal plane. As shown in FIG. 8A, prior techniques treated such an example in the same way as if the center pixel were located behind the focal plane (e.g., as discussed above with respect to FIG. 6A). The resulting accumulation pattern 802 is always vertically symmetric. This means that the rendering is the same even if the depth order of the objects were flipped, counter to reality. In the example of FIG. 8B, embodiments allow anything in front of the center pixel to contribute to the output pixel value, similar to the examples discussed above in FIGS. 6B and 7B. However, in this example, some information is accumulated, e.g., regions 804, which fall outside the visual cone, leading to information being used that does not naturally contribute to an output pixel. By accumulating this additional information, the calculations are simplified, improving the performance of the system. For example, to exclude these regions 804, the system has to first check whether the depth value of the source pixel is less than focal depth. Then depending on this result, different formulas have to be used to calculate the effective blur radius. This leads to additional branching which reduces performance. Additionally, in testing, excluding regions 804 did not consistently improve the appearance of the resulting blur. As such, by including regions 804, performance is improved without sacrificing the quality of the appearance of the blur effect.

Figure 9B:
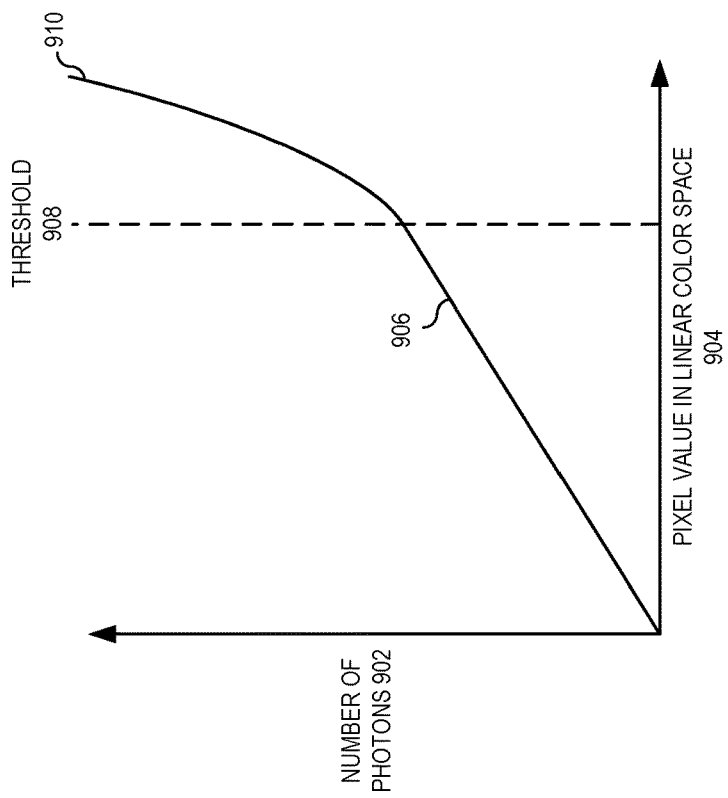
FIGS. 9A and 9B illustrate diagrams of an approximation of camera sensor saturation in accordance with one or more embodiments.
Figure 9A:
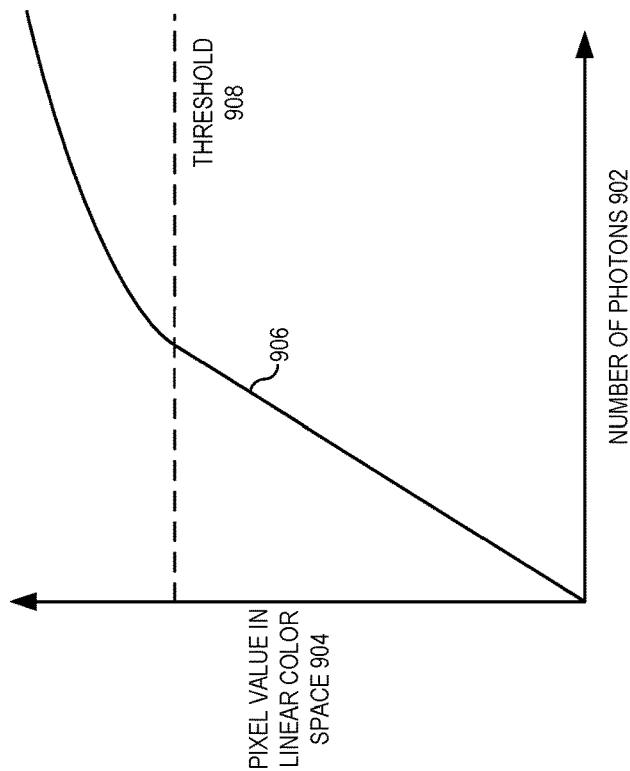

FIGS. 9A and 9B illustrate diagrams of an approximation of camera sensor saturation in accordance with one or more embodiments. As discussed above, the lens blur rendering system optionally enables the user to add specular highlights to the lens blur effect. Specular highlights allow for bright pixels in an image, which were much brighter in reality than they appear, because of the camera's limited dynamic range and clipping, to appear more realistically bright.

Furthermore, pixel values are typically gamma encoded. However, because lens blur is an optical phenomenon, blur is computed in linear gamma space, rather than encoded gamma space. Embodiments generate more realistic bokehs with specular highlights using pixel values that are not gamma encoded or are encoded in a linear gamma color profile. Accordingly, the lens blur rendering system converts the gamma encoded values into linear gamma space. Once the pixel values have been converted into linear gamma space, any pixels that are at saturation do not accurately represent the true number of photons corresponding to the bright spots. Without knowing details of the camera sensor used to capture the image, the sensor pixel saturation is approximated. For example, as shown in FIG. 9, the camera sensor pixel saturation curve is shown where the x-axis represents the number of photons 902 and the y-axis represents the pixel value in linear color space 904. The using a quadratic curve above a saturation threshold value. The number of photons and pixel value rise linearly, as shown at 906, until a threshold pixel value 908 is reached. At the threshold value the camera sensor is considered to be saturated and therefore no longer represents an accurate pixel value or number of photons. The pixel values are then boosted above the threshold based on a quadratic approximation curve, such as the parabolic curve shown at 910 in FIG. 9B. For example, for linear-gamma pixel values above the threshold value is increased by a value proportional to the amount exceeding the threshold, squared. Before outputting a pixel value, a reverse transformation is applied to the linear gamma values. For example, square root of the pixel values above the threshold is computed. This is performed for each color channel, keeping the original color of the bright spots in the image, rather than boosting the brightness monochromatically. This provides more colorful specular highlights which more closely mimics the actual brightness of the objects captured in the image, which makes the resulting highlights more realistic.

Figure 10:
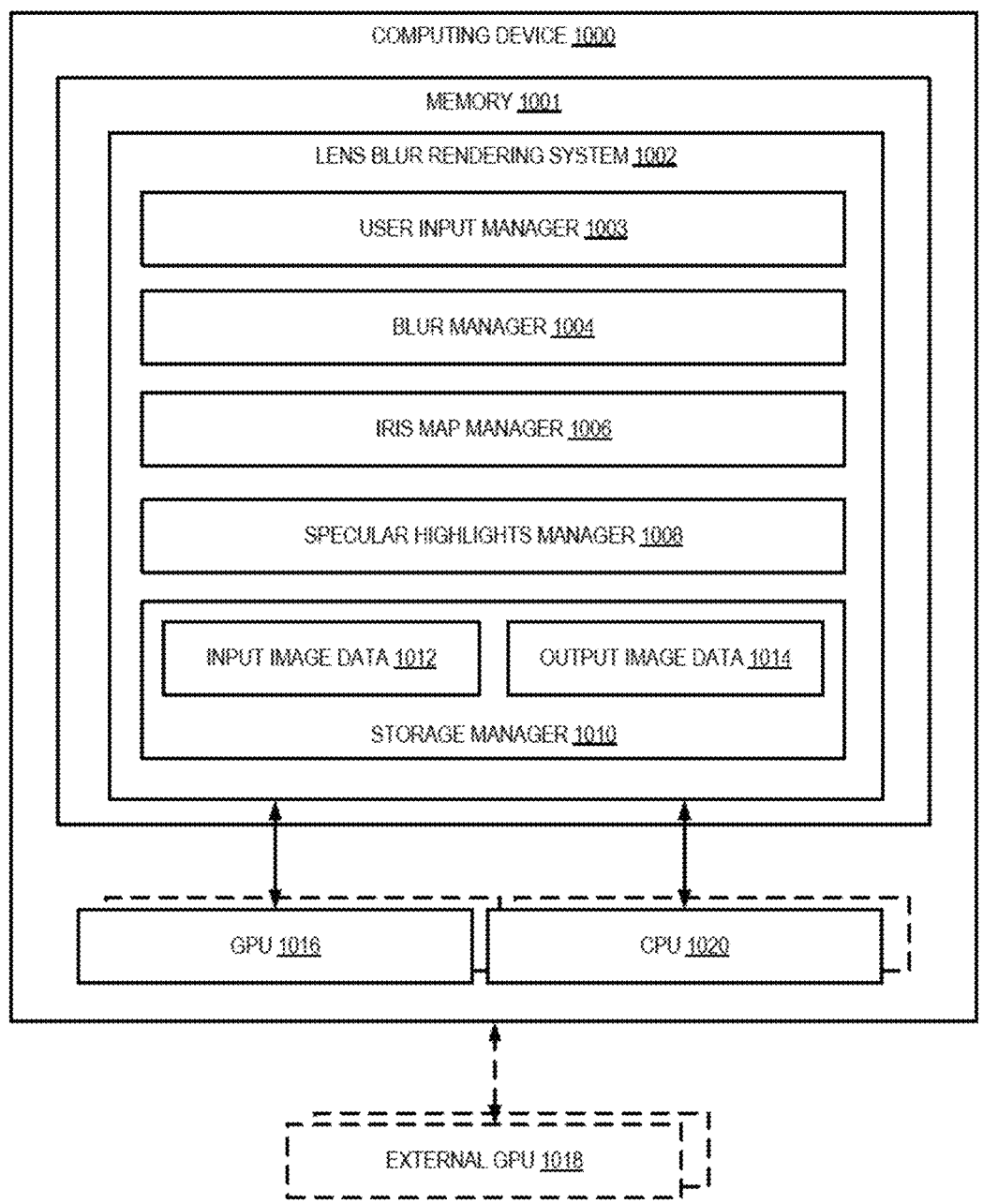
FIG. 10 illustrates a schematic diagram of a lens blur rendering system in accordance with one or more embodiments.

FIG. 10 illustrates a schematic diagram of a lens blur rendering system (e.g., "lens blur rendering system" described above) in accordance with one or more embodiments. As shown, a computing device 1000 includes memory 1001, including volatile memory, non-volatile memory, storage media, etc. as further described below with respect at least to FIG. 13. The lens blur rendering system 1002 is stored in memory 1001 as program code, data structures, etc. and includes, but is not limited to, a user input manager 1003, a blur manager 1004, an iris map manager 1006, a specular highlights manager 1008, and a storage manager 1010. The storage manager 1010 includes input image data 1012 and output image data 1014.

The lens blur rendering system 1002 includes a user input manager 1003 that allows users to provide input to the computing device 1000. For example, the user input manager 1003 allows users to select one or more images to which to add blur effects. In some embodiments, the user input manager 1003 enables a user to select one or more images from images stored or accessible by storage manager 1010. In some embodiments, the user input manager 1003 enables a user to provide one or more images to the blur manager for processing. Additionally, the user input manager 1003 allows users to blur parameters, such as a blur radius, specular highlights parameters, distance of interest, etc.

As illustrated in FIG. 10, the lens blur rendering system 1002 includes the blur manager 1004. In particular, blur manager 1004 receives an image to obtains an input image from storage manager 1010. For example, the user of lens blur rendering system 1002 provides an input image to which to add the lens blur effect. For example, in some embodiments, the user navigates a local file system to identify the input image stored locally on disk, navigate to a storage location that is network accessible (e.g., a remote storage location, uniform resource locator address, etc.), upload the input image to a server hosting the lens blur rendering system, etc. As discussed further below, the storage manager 1010 maintains input images received from a user to which the lens blur effect is to be applied. The blur manager 1004 also receives blur parameters from the user which are used to compute the lens blur effect. For example, in some embodiments, the user specifies the focal point (e.g., the distance of interest), the blur radius, the iris shape, and optionally specular highlight parameters (e.g., the threshold value and strength value). In some embodiments, some or all of the blur parameters are set to a default value if no value is specified by the user.

Using the input image, depth map, and the blur parameters, the blur manager computes an output pixel value for each pixel of the output image. For example, in some embodiments, the blur manager implements the following formula to calculate the output value for each pixel:

$$\text{output } [x,y,c] = \text{from\_linear (compress (linear\_output } [x,y,c])) \quad (1)$$
$$\text{if c in COLOR\_CHANNELS}$$
$$\text{else linear\_output } [x,y,c]$$

Linear_output[x,y,c] is a function which generates a weighted sum of input pixel values for the accumulation region for each pixel in each color channel. The pixel values provided by the linear_output function are in linear color space. These values are compressed and then converted into gamma color space (e.g., as shown above using the compress( ) and from_linear( ) functions) to provide the output value for each pixel of the output image. In some embodiments, these functions are implemented according to the following formulas:

$$\text{from\_linear } (x) = \text{pow } (x, 1.0 \text{ / GAMMA}) \quad (2)$$
$$\begin{aligned}\text{compress } (x) = &\text{ BOOST\_THRESHOLD} - 0.5*\text{BOOST\_TEMP} \\ &+ \text{sqrt (BOOST\_TEMP } (x - \text{BOOST\_THRESHOLD})) \\ &+ 0.25 * \text{BOOST\_TEMP}*\text{BOOST\_TEMP} \\ &\text{if } (x > \text{BOOST\_THRESHOLD}) \\ &\text{else } x\end{aligned} \quad (3)$$
$$\text{BOOST\_TEMP} = (1.0 - \text{BOOST\_THRESHOLD}) ** 2 \text{ / BOOST\_AMOUNT} \quad (4)$$

As shown above, the from_linear function calculates the linear pixel value to the power of 1/gamma. The compress function is used to compress high brightness areas, this simulates camera sensor saturation, creating a more realistic effect. To calculate the linear_output, in some embodiments, the following formulas are used:

$$\begin{aligned}\text{linear\_output } [x,y,c] = &\text{ numerator } [x,y,c] \text{ / denominator } [x,y] \\ &\text{if denominator } [x,y,c] > 0.0 \\ &\text{else } 0.0\end{aligned} \quad (5)$$
$$\text{numerator } [x,y,c] = \text{sum } (i, \text{weight } [x,y,i] * \text{source } [x,y,c,i]) \quad (6)$$
$$\text{denominator } [x,y] = \text{sum } (i, \text{weight } [x,y,i]) \quad (7)$$
$$\text{source } [x,y,c,i] = \text{linear\_input } [x + \text{offset\_x}[i], y + \text{offset\_y}[i], c] \quad (8)$$
$$\begin{aligned}\text{linear\_input } [u,v,c] = &\text{ expand } (\text{to\_linear } (\text{input\_color } [u, v, c])) \\ &\text{if } c \text{ in COLOR\_CHANNELS} \\ &\text{else input\_color } [u, v, c]\end{aligned} \quad (9)$$

As shown above, i is an index that represents which source pixel is being processed. The source pixels are those from the accumulation region for the output pixel being processed. In some embodiments, numerator and denominator are temporary variables that store the sum of the weighted source pixel value (the numerator) and the sum of the pixel weights (the denominator). The source pixel values (e.g., source $[x,y,c,i]$ shown above) are calculated from the accumulation region for the output pixel being processed. The accumulation region is represented by offset_x[i] and offset_y[i], where the maximum offset in the x- and y-directions correspond to the blur radius.

In some embodiments, if specular highlights are enabled, the specular highlights parameters received from the user or default values are used when converting the source pixel values into linear color space. In some embodiments, specular highlights manager 1008 maintains the specular highlights parameters received from the user or provide default parameters to be used if no parameters are received from the user. Additionally, if specular highlights are disabled, the specular highlights manager sets BOOST_AMOUNT to zero. For example, in some embodiments, the following formulas are used to expand high brightness areas to account for camera sensor saturation, as discussed above with respect to FIG. 2 and FIG. 9, and to convert the gamma pixel values to linear pixel values:

$$\text{expand } (x) = x + \text{BOOST\_AMOUNT} * (\text{max } (0.0, x - \text{BOOST\_THRESHOLD}) \text{ / } (1.0 - \text{BOOST\_THRESHOLD})) ** 2.0 \quad (10)$$
$$\text{to\_linear } (x) = \text{pow } (x, \text{GAMMA}) \quad (11)$$

In the above formulas, the BOOST_AMOUNT and BOOST_THRESHOLD are specified by the user in the specular highlights parameters (e.g., strength value and threshold value, respectively). The threshold value defines the threshold value at which the quadratic approximation curve of pixel value to number of photons is used, as depicted in FIG. 9.

As discussed above with respect to FIGS. 6A-8B, in some embodiments, the source pixel values are weighted depending on how close they are to the focal plane (e.g., the distance of interest). This weight is calculated according to the following formulas:

$$\begin{aligned}\text{weight } [x,y,i] = &\text{ saturate } (\text{cur\_radius } [x,y,i] - \text{iris\_threshold } [i]) \\ &* \text{raw\_weight } [x + \text{offset\_x}[i], y + \text{offset\_y}[i]]\end{aligned} \quad (12)$$
$$\text{saturate } (x) = \min (\max (0.0, x), 1.0) \quad (13)$$
$$\text{raw\_weight } [u,v] = \text{weight\_from\_radius } (\text{abs } (\text{defocus } [u,v])) \quad (14)$$
$$\text{weight\_from\_radius } (x) = (1.0 \text{ / PI}) \text{ / } ((1.0 \text{ / PI}) + x**2) \quad (15)$$

As shown above, the weight for each pixel is calculated by saturating the cur_radius value for the pixel less the iris_threshold for that pixel. The cur_radius is the effective blur radius at this pixel and the iris_threshold is the minimum effective blur radius for this pixel to contribute to the output pixel. As such, if the cur_radius is greater than the iris_threshold for a given pixel, then this pixel value contributes to the output pixel value. This difference is saturated to create a gradual edge on the blur to anti-alias the blur. Once saturated, this is multiplied by the raw_weight for the pixel to obtain the weight for that pixel of the accumulation region. As discussed, the raw_weight is calculated based on how far the source pixel is from the plane of focus, and approximates an inverse square falloff that is clipped to 1.0 near the plane of focus.

The effective blur radius is calculated based on the relative depths of the source pixel and the output pixel, as shown in the formula below. This is calculated by taking the absolute value of the processed_defocus, which is the minimum defocus value between the output pixel and the source pixel from the accumulation region. For example, if a defocus value of the output pixel is negative and the defocus value of the source pixel is positive or zero, the minimum defocus value is that of the output pixel. The value of defocus gives the expected amount of defocus (roughly the radius of the bokeh) in pixels, based on the difference of the source pixel depth and the focal plane depth, where depth $[u,v]$ is the depth channel value (between 0.0 and 1.0) at source pixel location $[u,v]$. Higher values of depth indicate objects farther away from the camera or higher relative depth distances.

$$\text{defocus } [u,v] = (\text{depth } [u, v] - \text{FOCAL\_PLANE\_DEPTH}) * \text{DEFOCUS\_SCALE} \quad (16)$$
$$\text{DEFOCUS\_SCALE} = \text{BLUR\_RADIUS / max (FOCAL\_PLANE\_DEPTH,} \\ 1.0 - \text{FOCAL\_PLANE\_DEPTH})$$

-continued $$\text{cur\_radius } [x,y,i] = \text{abs (processed\_defocus } [x,y,i]) \quad (17)$$
$$\text{processed\_defocus } [x,y,i] = \min (\text{defocus}) [x,y], \text{defocus } [x + \text{offset\_x}[i], y + \text{offset\_y}[i]])$$

As shown above, values from an iris map are used to determine whether a source pixel from the accumulation region contributes to an output pixel. The value of focal plane depth is determined by reading the depth value from the depth map for the pixel being processed. In some embodiments, the depth map includes values between 0 and 1, inclusive, where higher values indicate objects further from the reference point of view (e.g., camera). The blur manager instructs iris map manager 1006 to precompute an iris map based on the iris shape selected by the user or based on a default iris shape if no such selection is made. As discussed above with respect to FIG. 5, the iris map includes threshold (e.g., effective blur radius) values for each source pixel in the input image which indicates a minimum amount of blur required to reach that source pixel. The farther the source pixel coordinate is from the output pixel coordinate, the higher threshold is required. The threshold value depends on the shape of the aperture. As shown below, the iris map is computationally expensive (e.g., at least due to the use of atan 2 functions). As such, rather than computing the iris map on demand, the iris map manager precomputes iris threshold values and store these values into a two-dimensional texture. In some embodiments, the iris map is calculated according to the following:

$$\begin{aligned}
&\text{iris\_threshold } [i] = \text{raw\_threshold } [i] - 1.0 \quad (18)\\
&\text{raw\_threshold } [i] = \text{radius } [i] / \text{iris\_extent } [i] \\
&\qquad \text{if radius } [i] > 0.0 \text{ else } 0.0\\
&\text{radius } [i] = \text{sqrt (offset\_x}[i]2 + \text{offset\_y}[i]2)\\
&\text{iris\_extent } [i] = \text{IRIS\_CURVATURE} * 1.0 + (1.0\text{-IRIS\_CURVATURE}) \\
&\qquad * \text{iris\_polygonal\_extent } [i]\\
&\text{iris\_polygonal\_extent } [i] = \cos (\text{PI/IRIS\_NUMBLADES}) / \cos (\text{iris\_angle } [i])\\
&\text{iris\_angle } [i] = \text{iris\_raw\_angle } [i] - \text{PI/IRIS\_NUMBLADES}\\
&\qquad - 2.0*\text{PI/IRIS\_NUMBLADES} * \text{floor (iris\_raw\_angle } [i]\\
&\qquad * \text{IRIS\_NUMBLADES} / (2.0*\text{PI}))\\
&\text{iris\_raw\_angle } [i] = \text{atan2 } (-\text{offset\_y } [i], \text{offset\_x } [i])
\end{aligned}$$

In the above equations, i is an index that represents which source pixel to consider. As discussed, for each output pixel, a corresponding accumulation region of source pixels centered on the output pixel coordinate is used to compute the output pixel value. This accumulation region is defined by the offset_x[i] and offset_y[i] terms where the maximum offset in the x- or y-direction is equal to the blur radius. The iris shape is defined by the IRIS_NUMBLADES and the IRIS_CURVATURE terms. In a camera, the shape of the iris is determined by the number of blades of the iris diaphragm and the curvature of the blades. For example, straight blades result in a polygonal shaped iris, while curved blades result in a more circular iris. Additionally, more blades lead to a rounder iris shape. Different iris shapes produce different bokeh in practice (e.g., out of focus points of light appear approximate the shape of the iris). By enabling the user to define the shape of the iris, the lens blur effect approximates the lens blur created with different iris shapes.

The above described techniques are efficiently implemented in parallel using one or more GPUs 1016. This includes GPUs of computing device 1000 or, optionally, external GPUs 1018 coupled to the computing device. In some embodiments, the blur manager creates an output image based on the input image. For example, in some embodiments, the initial state of the output image is a copy of the input image. In some embodiments, the initial state of the output image has no pixel values but share the depth map associated with the input image. The output image is then divided into pixel blocks by the blur manager. The size of the pixel block varies depending on the resources of the computing device. For example, the size of the pixel block depends on the amount of memory available in the one or more graphics processing units (GPUs) 1016. As an example, the pixel block is a 16 pixel by 16 pixel block.

The blur manager computes a blur for each pixel in each pixel block of the output image. As discussed above with respect to FIGS. 5-8B The value of each pixel in a pixel block is based on a weighted average of an accumulation region of pixels in the source image, centered on the coordinates of that output pixel in the pixel block. The size of the accumulation region is based on the blur radius. For example, if the blur radius is 63 pixels, then for each pixel in the pixel block, a 127 pixel by 127 pixel accumulation region needs to be processed.

In some embodiments, the blur manager divides the accumulation region into blocks to be processed by threadgroups of the one or more GPUs 1016. For example, the accumulation region is divided into 17 pixel by 17 pixel iris blocks for processing. Depending on the size of the output image, the size of the pixel blocks, and the size of the iris blocks, the blur manager 1004 instructs the GPU 1016 to allocate a number of threadgroups to process the image. As an example, an output image having dimensions of 100 pixels by 100 pixels, with a blur radius of 15 pixels, results in an accumulation region 2*15+1=31 pixels on a side. With 16 by 16 output blocks, the output image is processed using a 7 block by 7 block array of output blocks and each accumulation region is processed using a 2 block by 2 block array of iris blocks. This results in a total of 196 independent 16×16 thread groups. For a single 16×16 threadgroup, the blur manager reads in a 32 pixel by 32-pixel block of color and depth data from the source image into local shared memory to reduce memory reading costs. In some embodiments, larger threadgroups are used, which leads to less redundancy in reading from global memory into local memory, but also has higher requirements for local memory. This in turn reduces the occupancy of the shaders, resulting in lower parallelism. As such, threadgroup size varies depending on GPU resources in a given lens blur rendering system implementation.

Each threadgroup reads in depth values for a 32×32 block of source pixels into local memory of the GPU. Each threadgroup then computes defocus values and raw_weight values, as described above at formulas 16 and 14 respectively, to store into local memory of the GPU. Each threadgroup then reads in a corresponding 32×32 block of color data for the source pixels and compute linear_input, as described above at formula 9, to store into local memory of the GPU. These block operations are performed in four parallel steps for the threadgroup. Then a shader, per thread, reads in the defocus value from local memory for an output pixel, and then loops through 17×17 values of the index i for each iris block to compute intermediate local sums of the numerator and denominator values, as described above at formulas 6 and 7. This processing is performed in parallel across output pixel locations, but process the accumulation location i in sequence.

For each threadgroup, in some embodiments, the shader writes out information about the local sums of weight to a three-dimensional texture, where the first dimension corresponds to a group index for the iris block of the accumulation region, and the second and third dimensions correspond to x and y respectively in the output image. Once weight values for the entire accumulation have been calculated, the values for the accumulation region are summed. For example, a reduction shader, using parallel reduction techniques, computes numerator [x,y,c] and denominator [x,y], as described above at formulas 6 and 7 respectively, and then finally output [x,y,c], as described above at formula 1. This reduction shader uses threadgroups equal to the number of blocks in the accumulation region and parallelizes fully along x and y.

Embodiments store iris shape information, source color values, and depth values each in their own two-dimensional textures. A three-dimensional texture is used to store intermediate weighted averages and another three-dimensional is used to store intermediate total weights. A two-dimensional texture is used to store the output color pixel values. The intermediate weighted averages, rather than intermediate weighted sums, are stored to avoid numerical problems when storing as half-precision floating point values. In general, for 8-bit images and depth maps, a half precision floating point (i.e., 16 bit) is sufficient to store color and depth information. However, because of the gamma transform, care must be taken not to truncate small values, if the input values are between 0.0 and 1.0. To address this, 32-bit floating points are used for intermediate values in the calculation of linear_input but then multiply linear_input by 4096.0 before storing into a half-float in local memory. This ensures that even 1.0/255.0 after a gamma transform of 3.0 still has a value of roughly 2.47e-4, which is larger than the smallest normal half float, which is roughly 6e-5. Also, the largest value is 4096.0, which is comfortably less than the largest half-float, 65504.

As shown above, the iris map is computationally expensive (e.g., at least due to the use of atan 2 functions). As such, rather than computing the iris map on demand, in some embodiments, the iris map manager precomputes iris threshold values and store these values into a two-dimensional texture. In some embodiments, the iris map is precomputed using threadgroups of size 17×17. The iris map manager 1006 also stores the minimum value for each threadgroup into a buffer. In some embodiments, the minimum value is computed using parallel reduction techniques (e.g., where each thread calculates the minimum of its own element and another element in the set, then the number of threads are reduced by half and another comparison is performed, and so on until a single element—the minimum value—remains). In some embodiments, the minimum values maintained by the iris manager 1006 is used to bypass accumulation regions for which minimal or no blur needs to be computed (e.g., those portions of the input image which remain in focus).

In some embodiments, the minimum values maintained by the iris map manager 1006 is used to bypass accumulation regions for which minimal or no blur needs to be computed (e.g., those portions of the input image which remain in focus). For instance, if the shader determines that the abs(defocus[u, v]) is smaller than the minimum iris value for the accumulation region, then this portion of the accumulation region falls entirely outside the iris for all threads in this threadgroup and are skipped. This is a large speedup for typical use cases where parts of the image are relatively in focus (e.g., the effective blur radius is less than 8).

In some embodiments, the blur manager 1004 monitors GPU performance while processing the blur effect on the output image. If a GPU has not computed in a threshold amount of time, then the blur manager switches processing to a central processing unit (CPU) 1020 instead. In some embodiments, if there are multiple GPUs available, then the blur manager 1004 distributes processing to all or some of the available GPUs. Once there are no pixel blocks waiting to be processed (e.g., all pixel blocks have either been processed or are currently being processed), the blur manager identifies one or more pixel blocks that have been processing for the longest amount of time (or beyond a threshold amount of time). These blocks are sent to idle GPUs for processing. The results for those blocks are used from whichever GPU completes processing the block first In general, for 8-bit images and depth maps, a half float (i.e., 16 bit) is sufficient to store color and depth information. However, because of the gamma transform, care must be taken not to truncate small values, if the input values are between 0.0 and 1.0. To address this, 32-bit floating point values are used for intermediate values in the calculation of linear_input which is then multiplied by 4096.0 before storing into a half-float in local memory. This ensures that even 1.0/255.0 after a gamma transform of 3.0 has a value of roughly 2.47e-4, which is larger than the smallest normal half float, which is roughly 6e-5. Also, the largest value is 4096.0, which is comfortably less than the largest half-float, 65504.

Likewise, raw_weight is scaled-up by a factor of 128.0 so that at a maximum defocus of 63 (e.g., where 63 is the largest blur radius), results in a value of roughly 1e-2 and at minimum defocus results in a weight value of 128. Other scale values are chosen depending on the largest blur radius being implemented.

In some embodiments, intermediate sums of source and weight are stored in thread-local memory as single precision floats, but in some embodiments the value of source is large enough that a half float cannot be used to store the value. The adjustment is to not store the local sums of source and weight into the intermediate 3D texture, but rather to store the local weighted average and weights. That is, for a given accumulation region, sum (i, source [x,y,c,i]*weight [x,y,i])/sum (i, weight [x,y,i]) is stored, rather than sum (i, source [x,y,c,i] *weight [x,y,i]). Therefore, the stored value is on the order of the scaled linear_input and not multiplied by 128.0, and the intermediate sum of source is recovered by multiplying by the intermediate sum of weights. The same principle is also applied in the reduction shader, since half floats are more efficient for shared memory storage in parallel reduction.

As illustrated in FIG. 10, the lens blur rendering system 1002 also includes a storage manager 1010. The storage manager 1010 maintains data for the lens blur rendering system 1002. The storage manager 1010 maintains data of any type, size, or kind as necessary to perform the functions of the lens blur rendering system 1002. The storage manager 1010, as shown in FIG. 10, includes the input image data 1012. The input image data 1012 includes one or more digital images, as discussed in additional detail above with respect to FIG. 2. In some embodiments, the input image data 1012 includes one or more depth maps corresponding to the one or more digital images, as discussed in detail above with respect to FIG. 2. As discussed, in some embodiments, the depth map data is included as a channel of the corresponding input image. Additionally, in various embodiments, the input image data includes any type of digital visual media, including digital images and/or digital videos. For example, input image data 1012 includes at least one digital image provided by a user, where the user seeks to add lens blur effects to the digital image. Input image data 1012 also includes information or data generated by the lens blur rendering system 1002 regarding the input images. For instance, input image data 1012 includes pixel identification, pixel labels, metadata, or other information regarding digital images utilized by the lens blur rendering system 1002.

As further illustrated in FIG. 10, the storage manager 1010 includes output image data 1014. Output image data 1014 includes one or more output digital images which have been processed by the lens blur rendering system 1002 to add lens blur effects to the one or more input digital images. As discussed above, the lens blur rendering system processes an input image to add a lens blur effect to it, resulting in an output image. The output images are maintained by storage manager 1010. In some embodiments, the storage manager 1010 manages various underlying storage devices coupled to the lens blur rendering system 1002 and/or computing device 1000. The storage devices include one or more non-transitory computer readable storage media, such as a hard disk drive (HDD), flash memory, a Universal Serial Bus (USB) drive or a combination these or other storage devices. In some embodiments, the storage manager 1010 manages storage of input and output image data in a remote storage service or system. For example, in some embodiments, the storage manager communicates over one or more public and/or private networks (e.g., the internet, a local area network, a storage area network, etc.) to a storage service that provides block storage, object storage, database storage, etc.

Embodiments have been described with respect to processing source images. In various embodiments, the techniques described above are applicable for processing input digital videos by applying the lens blur effect to each frame of the input digital video. Further, in addition to lens blur effects, embodiments are applicable to other applications where a spatially varying blur needs to be computed where the weight of a source pixel contributing to the output is only a function of the center pixel and the source pixel.

Each of the components 1004-1010 of the lens blur rendering system 1002 and their corresponding elements (as shown in FIG. 10) are in communication with one another using any suitable communication technologies. It is recognized that although components 1004-1010 and their corresponding elements are shown to be separate in FIG. 10, in some embodiments, any of components 1004-1010 and their corresponding elements are combined into fewer components, such as into a single facility or module, divided into more components, or configured into different components depending on the needs of a particular embodiment.

The components 1004-1010 and their corresponding elements comprise software, hardware, or both. For example, the components 1004-1010 and their corresponding elements comprise one or more instructions stored on a computer-readable storage medium and executable by processors of one or more computing devices. When executed by the one or more processors, the computer-executable instructions of the lens blur rendering system 1002 cause a client device and/or a server device to perform the methods described herein. Alternatively, the components 1004-1010 and their corresponding elements comprise hardware, such as a special purpose processing device to perform a certain function or group of functions. Additionally, the components 1004-1010 and their corresponding elements comprise a combination of computer-executable instructions and hardware.

Furthermore, the components 1004-1010 of the lens blur rendering system 1002, in various embodiments, are implemented as one or more stand-alone applications, as one or more modules of an application, as one or more plug-ins, as one or more library functions or functions that are called by other applications, and/or as a cloud-computing model. Thus, the components 1004-1010 of the lens blur rendering system 1002, in various embodiments, are implemented as a stand-alone application, such as a desktop or mobile application. Furthermore, the components 1004-1010 of the lens blur rendering system 1002, in various embodiments, are implemented as one or more web-based applications hosted on a remote server. Alternatively or additionally, the components of the lens blur rendering system 1002, in various embodiments, are implemented in a suit of mobile device applications or "apps." To illustrate, the components of the lens blur rendering system 1002, in various embodiments, is implemented in a digital image or video editing application, including but not limited to ADOBE® PHOTOSHOP® or ADOBE® PREMIERE® PRO. "ADOBE®," "ADOBE® PHOTOSHOP®," and "ADOBE® PREMIERE® PRO" are either registered trademarks or trademarks of Adobe Inc. in the United States and/or other countries.

Figure 11:
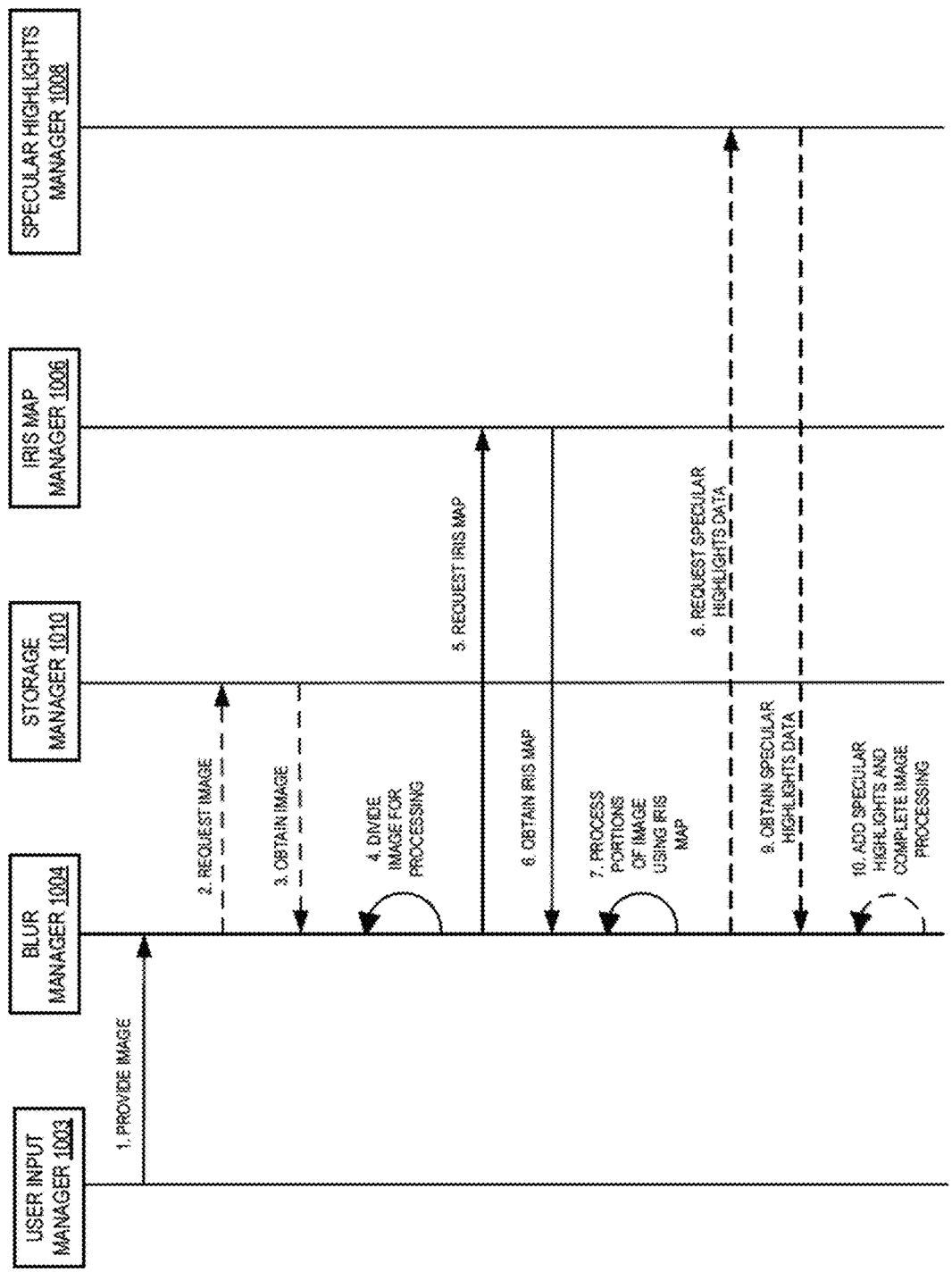
FIG. 11 illustrates a sequence diagram of a lens blur rendering system in accordance with one or more embodiments.

FIG. 11 illustrates a sequence diagram 1100 of a lens blur rendering system in accordance with one or more embodiments. As shown in FIG. 11, adding blur effects to an image starts at numeral 1 in which a user provides an image to blur manager 1004 using user input manager 1003. In some embodiments, the user provides an image file and a corresponding depth map, where the depth map is provided as a separate file or as a channel of the image. Additionally, at numeral 1, the user provides blur parameters. As discussed, the blur parameters include one or more of a blur radius, specular highlights parameters, distance of interest, etc. In some embodiments, any blur parameters not specified by the user are set to default values by blur manager 1004.

In some embodiments, rather than providing an image file at numeral 1, the user provides a selection of an image file accessible to storage manager 1010. As shown in FIG. 11, if an image selection is made, the blur manager 1004, at numeral 2, requests the selected image from storage manager 1010 and, at numeral 3, receives the selected image from storage manager 1010.

At numeral 4, blur manager 1004 begins processing the image. As discussed above, the blur manager initializes an output image and divides the output image into a plurality of pixel blocks. The plurality of pixel blocks varies in size depending on available resources, such as available GPU memory. For example, each pixel block, in some embodiments, is a 16 pixel by 16 pixel block of pixels. As discussed above, the value of each pixel in a pixel block is computed based on an accumulation region of pixels from the input image, where the accumulation region is centered on the coordinates of the output pixel being computed and varies in size depending on the blur radius. To more efficiently process a given accumulation region, the blur manager further divides the accumulation region into a plurality of iris blocks. As discussed, depending on the size of the output image, the size of the pixel blocks, and the size of the iris blocks, the blur manager 1004 instructs one or more GPUs to allocate a number of threadgroups to process the image. The blur manager 1004 then reads in a block of color and depth data from the input image into shared memory of the one or more GPUs and begins calculating the values of each output pixel of the output image based on their corresponding accumulation regions.

As discussed, not all pixels in an accumulation region contribute to the output pixel value. For example, pixels farther away in depth from the output pixel contribute less or not at all to the output pixel value. Additionally, depending on iris shape, not all pixels in an accumulation region contribute to the output pixel value. An iris threshold value is used to determine whether a given pixel in an accumulation region contributes to the output pixel value. However, as discussed above, the iris threshold values are expensive to calculate, therefore rather than calculating the values on demand for each pixel, in some embodiments, an iris map that includes iris thresholds for a plurality of pixels may be precomputed. As shown in FIG. 11, at numeral 5, the blur manager 1004 requests an iris map from iris map manager 1006. The iris map is precomputed from one or more accumulation regions at a time. The iris map is returned to the blur manager 1004 at numeral 6. In some embodiments, the iris map manager 1006 also stores the minimum threshold value for each accumulation region or other portion of the image which is precomputed, and these minimum values are provided with the precomputed iris map.

At numeral 7, the blur manager 1004 processes the portions of the image using the iris map. In some embodiments, the minimum values calculated by the iris map manager 1006 is used to bypass accumulation regions for which minimal or no blur needs to be computed (e.g., those portions of the input image which remain in focus). For instance, as discussed, if the blur manager determines that the largest defocus value for an accumulation region is smaller than the minimum iris value for the accumulation region based on the iris map, then further processing of the accumulation region is skipped. For accumulation regions that are processed, the blur manager stores intermediate weighted values for pixels in the accumulation region to local memory (e.g., as a texture on a GPU), the weighted pixel values in an accumulation region are then summed to determine the output pixel value. This processing iterates through each output pixel until the blur effect for the entire output image has been calculated.

Additionally, as shown in FIG. 11, optionally specular highlights may be added to the blur effect. As discussed, if specular highlights are enabled, the specular highlight manager maintains specular highlights parameters. This includes, in some embodiments, a threshold value above which a pixel is considered saturated and a strength value that indicates how much to increase a saturated pixel's value. At numeral 8, the blur manager requests specular highlights data from the specular highlights manager 1008.

At numeral 9, the specular highlights manager returns the specular highlights data. For instance, the specular highlights parameters are returned to the blur manager. As discussed, using the specular highlights data, the blur manager, at numeral 10, converts gamma encoded pixel values into linear pixel values before increasing the linear pixel values based on the specular highlights parameters. As discussed, this is performed in each color channel, allowing the resulting specular highlights to more accurately reflect the color of the input image. The boosted linear pixel values are then converted back into gamma values, adding the specular highlights to the blur effect. In some embodiments, as discussed, the blur manager incorporates specular highlights, if enabled, as part of processing performed at numeral 7.

Figure 12:
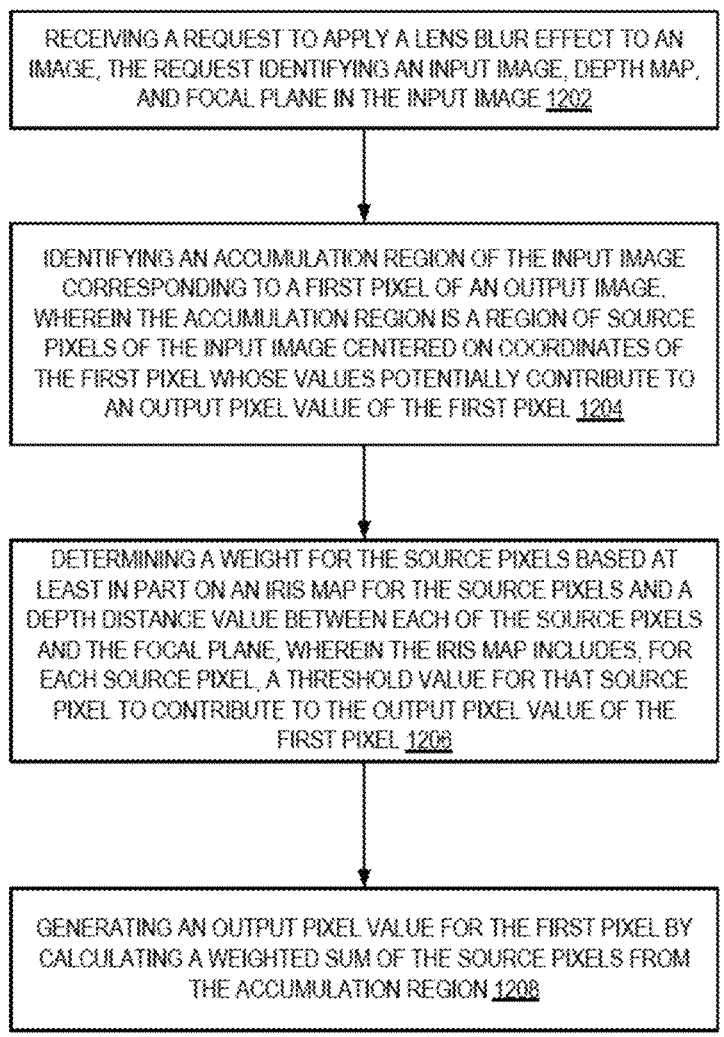
FIG. 12 illustrates a flowchart of a series of acts in a method of adding blur to an image in accordance with one or more embodiments.

FIGS. 1-11, the corresponding text, and the examples, provide a number of different systems and devices that allows a user to facilitate selection of target individuals within digital visual media. In addition to the foregoing, embodiments are also described in terms of flowcharts comprising acts and steps in a method for accomplishing a particular result. For example, FIG. 12 illustrates flowcharts of exemplary methods in accordance with one or more embodiments. The methods described in relation to FIG. 12, in various embodiments, are performed with less or more steps/acts or the steps/acts are performed in differing orders. Additionally, in some embodiments, the steps/acts described herein are repeated or performed in parallel with one another or in parallel with different instances of the same or similar steps/acts.

FIG. 12 illustrates a flowchart of a series of acts in a method of adding blur to an image in accordance with one or more embodiments. In one or more embodiments, the method 1200 is performed in a digital medium environment that includes the lens blur rendering system 1002. The method 1200 is intended to be illustrative of one or more methods in accordance with the present disclosure and is not intended to limit potential embodiments. Alternative embodiments include additional, fewer, or different steps than those articulated in FIG. 12.

As illustrated in FIG. 12, the method 1200 includes an act 1202 of receiving a request to apply a lens blur effect to an image, the request identifying an input image, depth map, and focal plane in the input image. As discussed, in some embodiments, the request is received using user input manager 1003 described above. For example, the request is made through a graphical user interface of lens blur rendering system 1002, e.g., through selection of a graphical user interface element corresponding to lens blur and providing an input image and lens blur parameters. As discussed, in some embodiments, the depth map is provided as a channel of the input image or is a separate file. In some embodiments, the lens blur parameters include a blur radius, a selection of a focal plane in the input image, and optionally specular highlight parameters (e.g., the threshold value and strength value). In some embodiments, some or all of the blur parameters are set to a default value if no value is specified by the user.

As shown in FIG. 12, the method 1200 also includes an act 1204 of identifying an accumulation region of the input image corresponding to a first pixel of an output image, wherein the accumulation region is a region of source pixels of the input image centered on coordinates of the first pixel whose values potentially contribute to an output pixel value of the first pixel. As discussed, in some embodiments, the accumulation region of the input image is identified using blur manager 1004 described above. The accumulation region is a portion of the input image whose size is determined based on a blur radius parameter specified in the blur parameters or a default value provided by the lens blur rendering system.

As illustrated in FIG. 12, the method 1200 also includes an act 1206 of determining a weight for the source pixels based at least in part on an iris map for the source pixels and a depth distance value between each of the source pixels and the focal plane, wherein the iris map includes, for each source pixel, a threshold value for that source pixel to contribute to the output pixel value of the first pixel. As discussed, in some embodiments, the weight is determined using blur manager 1004 and the iris map is generated by iris map manager 1006 described above. As discussed, the weight for each source pixel is based on a depth distance between the source pixel and the focal plane, with pixels that are farther from the focal plane being weighted less than pixels closer to the focal plane.

Furthermore, as illustrated in FIG. 12, the method 1200 also includes an act 1208 of generating an output pixel value for the first pixel by calculating a weighted sum of the source pixels from the accumulation region. As discussed, in some embodiments, the output pixel is generated using blur manager 1004 described above. In particular, the act 1208 includes storing intermediate output pixel values for each iris block as intermediate weighted averages comprising the intermediate output pixel value divided by an intermediate sum of source pixel weights for the iris block.

In some embodiments, this method is iteratively performed to generate an output pixel value for each pixel of the output image based on a corresponding accumulation region of the input image that is centered on the coordinates of the pixel being processed. This processing is parallelized among a plurality of threadgroups of a GPU or other accelerator. Each threadgroup processes a separate pixel block of the output image. The size of the threadgroups varies depending on the available resources of the GPU (e.g., local memory size, etc.). Each thread of a given threadgroup processes one or more output pixels of the pixel block to determine an output pixel value with the lens blur effect added.

In some embodiments, the method 1200 includes generating at least a portion of the iris map based on an iris shape parameter, wherein the iris map includes a plurality of iris blocks, each corresponding to a different portion of the accumulation region. As discussed, the iris map identifies a threshold value for each pixel of the accumulation region to contribute to the output pixel corresponding to the accumulation region. The iris map includes a plurality of iris blocks corresponding to portions of the accumulation region. In some embodiments, the method 1200 includes identifying a minimum threshold value for each iris block and storing the minimum threshold value for each iris block. This minimum threshold value is used to process the pixels of the output image more efficiently. For example, the minimum threshold value of the iris block is compared to a maximum effective blur radius for each iris block of the accumulation region, and determining the weight for each source pixel from the input image in iris blocks of the accumulation region when the maximum effective blur radius is larger than the minimum threshold value of the iris block. This allows blocks that are close to the focal plane, and therefore have minimal blur to be skipped, rather than processed naively only to determine that no blur effect is to be applied to these blocks.

In some embodiments, more realistic blur effects are generated by processing pixel values in linear space. As such, the method 1200 further includes converting source pixel values to linear pixel values and increasing the converted source pixel values in each color channel above a threshold pixel value using a saturation curve. In some embodiments the saturation curve is a quadratic approximation based at least on an amount of the converted source pixel value greater than the threshold pixel value. Once the source pixels have been processed to determine an output pixel value, the output value is then converted back to gamma-space before the resulting output image is displayed. For example, method 1200 further includes converting the output pixel value from a linear pixel value to a gamma-encoded pixel value.

Figure 13:
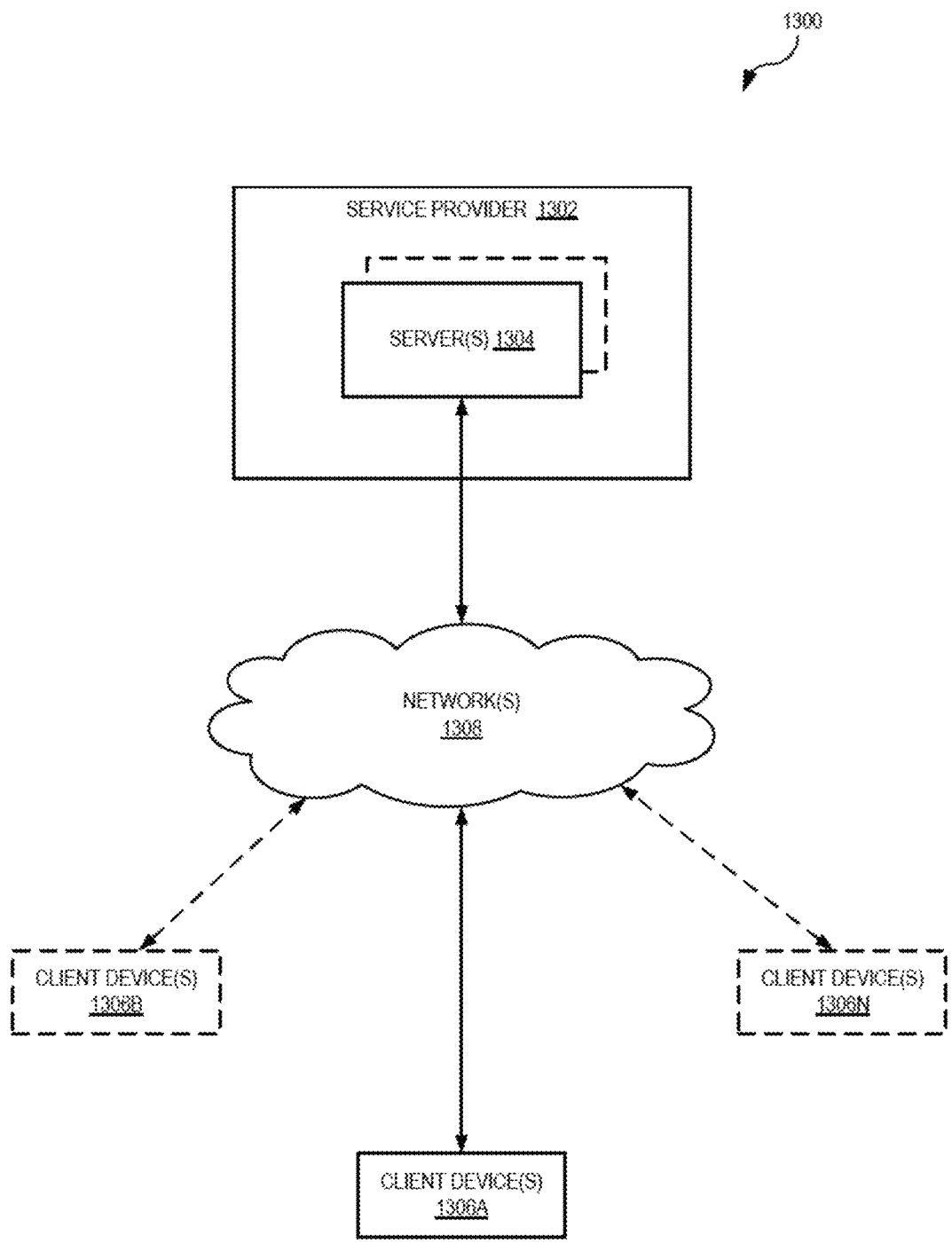
FIG. 13 illustrates a schematic diagram of an exemplary environment in which the lens blur rendering system operates in accordance with one or more embodiments.

FIG. 13 illustrates a schematic diagram of an exemplary environment 1300 in which the lens blur rendering system 1002 operates in accordance with one or more embodiments. In one or more embodiments, the environment 1300 includes a service provider 1302 which includes one or more servers 1304 connected to a plurality of client devices 1306A-1306N via one or more networks 1308. The client devices 1306A-1306N, the one or more networks 1308, the service provider 1302, and the one or more servers 1304 communicate with each other or other components using any communication platforms and technologies suitable for transporting data and/or communication signals, including any known communication technologies, devices, media, and protocols supportive of remote data communications, examples of which are described in more detail below with respect to FIG. 14.

Although FIG. 13 illustrates a particular arrangement of the client devices 1306A-1306N, the one or more networks 1308, the service provider 1302, and the one or more servers 1304, various additional arrangements are possible. For example, the client devices 1306A-1306N directly communicate with the one or more servers 1304, bypassing the network 1308. Or alternatively, the client devices 1306A-1306N directly communicate with each other. The service provider 1302, ins some embodiments, is a public cloud service provider which owns and operates their own infrastructure in one or more data centers and provides this infrastructure to customers and end users on demand to host applications on the one or more servers 1304. The servers include one or more hardware servers (e.g., hosts), each with its own computing resources (e.g., processors, memory, disk space, networking bandwidth, etc.) which are securely divided between multiple customers, each of which host their own applications on the one or more servers 1304. In some embodiments, the service provider is a private cloud provider which maintains cloud infrastructure for a single organization. The one or more servers 1304 similarly include one or more hardware servers, each with its own computing resources, which are divided among applications hosted by the one or more servers for use by members of the organization or their customers.

Similarly, although the environment 1300 of FIG. 13 is depicted as having various components, in various embodiments, the environment 1300 has additional or alternative components. For example, in some embodiments, the environment 1300 is implemented on a single computing device with the lens blur rendering system 1002. In particular, the lens blur rendering system 1002 is implemented in whole or in part on the client device 1302A. Alternatively, in some embodiments, the environment 1300 is implemented in a distributed architecture across multiple computing devices.

As illustrated in FIG. 13, the environment 1300 include client devices 1306A-1306N. The client devices 1306A-1306N comprise any computing device. For example, client devices 1306A-1306N comprise one or more personal computers, laptop computers, mobile devices, mobile phones, tablets, special purpose computers, TVs, or other computing devices, including computing devices described below with regard to FIG. 14. Although three client devices are shown in FIG. 13, it is appreciated that client devices 1306A-1306N comprise any number of client devices (greater or smaller than shown).

Moreover, as illustrated in FIG. 13, the client devices 1306A-1306N and the one or more servers 1304 communicate via one or more networks 1308. The one or more networks 1308 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1308 are any suitable network over which the client devices 1306A-1306N access service provider 1302 and server 1304, or vice versa. The one or more networks 1308 are discussed in more detail below with regard to FIG. 14.

In addition, the environment 1300 also includes one or more servers 1304. The one or more servers 1304 generate, store, receive, and transmit any type of data, including input image data 1012, output image data 1014, or other information. For example, a server 1304 receives data from a client device, such as the client device 1306A, and send the data to another client device, such as the client device 1302B and/or 1302N. The server 1304 also transmits electronic messages between one or more users of the environment 1300. In one example embodiment, the server 1304 is a data server. The server 1304 also comprises a communication server or a web-hosting server. Additional details regarding the server 1304 are discussed below with respect to FIG. 14.

As mentioned, in one or more embodiments, the one or more servers 1304 includes or implement at least a portion of the lens blur rendering system 1002. In particular, the lens blur rendering system 1002 comprises an application running on the one or more servers 1304 or, in some embodiments, a portion of the lens blur rendering system 1002 is downloaded from the one or more servers 1304. For example, the lens blur rendering system 1002 includes a web hosting application that allows the client devices 1306A-1306N to interact with content hosted at the one or more servers 1304. To illustrate, in one or more embodiments of the environment 1300, one or more client devices 1306A-1306N accesses a webpage supported by the one or more servers 1304. In particular, the client device 1306A runs a web application (e.g., a web browser) to allow a user to access, view, and/or interact with a webpage or website hosted at the one or more servers 1304.

Upon the client device 1306A accessing a webpage or other web application hosted at the one or more servers 1304, in one or more embodiments, the one or more servers 1304 provides access to one or more digital images (e.g., the input image data 1012, such as camera roll or an individual's personal photos) stored at the one or more servers 1304. Moreover, the client device 1306A receives a request (i.e., via user input) to add a lens blur effect to one or more of the digital images, and provide the request to the one or more servers 1304. Upon receiving the request, the one or more servers 1304 automatically performs the methods and processes described above to generate the lens blur affect for the one or more digital images. The one or more servers 1304 provide output image data, including one or more output digital images to which the lens blur effect has been applied to the client device 1306A for display to the user. Moreover, the user interacts with the client device 1306A indicating any changes to be made to the lens blur effect (e.g., changed blur radius, distance of interest, etc.).

As just described, in some embodiments, the lens blur rendering system 1002 is implemented in whole, or in part, by the individual elements 1302-1308 of the environment 1300. It is appreciated that although certain components of the lens blur rendering system 1002 are described in the previous examples with regard to particular elements of the environment 1300, various alternative implementations are possible. For instance, in one or more embodiments, the lens blur rendering system 1002 is implemented on any of the client devices 1306A-N. Similarly, in one or more embodiments, the lens blur rendering system 1002 is implemented on the one or more servers 1304. Moreover, different components and functions of the lens blur rendering system 1002 are implemented separately among client devices 1306A-1306N, the one or more servers 1304, and the network 1308.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media includes any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which is accessible by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media include a network and/or data links which is used to carry desired program code means in the form of computer-executable instructions or data structures and which is accessed by a general purpose or special purpose computer. Combinations of the above are also included within the scope of computer-readable media.

Further, upon reaching various computer system components, program code means in the form of computer-executable instructions or data structures are transferred automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it is intended to be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art appreciate that embodiments of the disclosure are practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure are practiced in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Some embodiments of the present disclosure are implemented in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model is comprised of various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). In some embodiments, a cloud-computing model is deployed using different deployment models such as private cloud, community cloud, public cloud, hybrid cloud, and so forth. In this description and in the claims, a "cloud-computing environment" is an environment in which cloud computing is employed.

Figure 14:
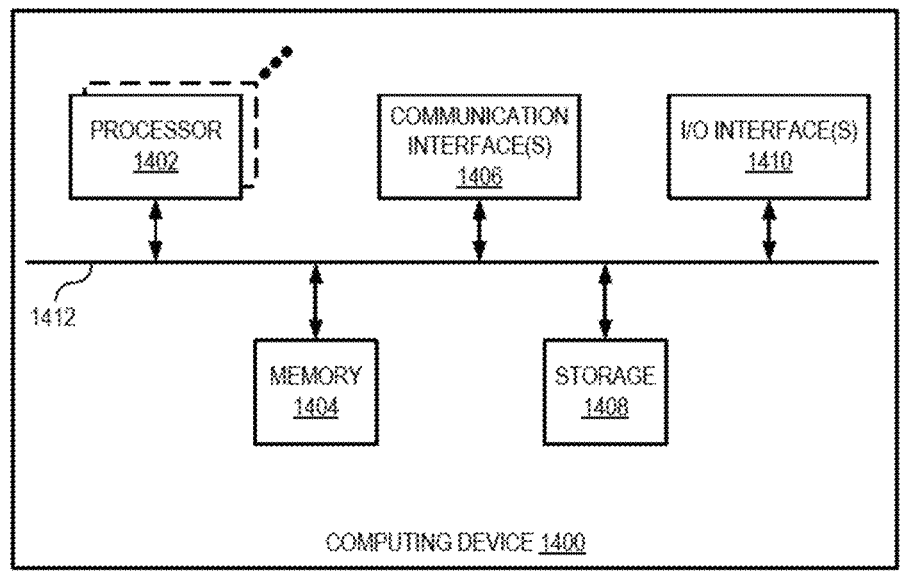
FIG. 14 illustrates a block diagram of an exemplary computing device in accordance with one or more embodiments.

FIG. 14 illustrates, in block diagram form, an exemplary computing device 1400 that is configured to perform one or more of the processes described above. One appreciates that one or more computing devices, such as the computing device 1400, implement the lens blur rendering system. As shown by FIG. 14, the computing device comprises a processor 1402, memory 1404, one or more communication interfaces 1406, a storage device 1408, and one or more I/O devices/interfaces 1410. In certain embodiments, the computing device 1400 includes fewer or more components than those shown in FIG. 14. Components of computing device 1400 shown in FIG. 14 is described in additional detail below.

In particular embodiments, processor(s) 1402 includes hardware for executing instructions, such as those making up a computer program. As an example and not by way of limitation, to execute instructions, processor(s) 1402 retrieves (or fetches) the instructions from an internal register, an internal cache, memory 1404, or a storage device 1408 and decode and execute them. In various embodiments, the processor(s) 1402 includes one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 is used for storing data, metadata, and programs for execution by the processor(s). The memory 1404 includes one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 is internal or distributed memory.

The computing device 1400 further includes one or more communication interfaces 1406. In various embodiments, a communication interface 1406 includes hardware, software, or both. The communication interface 1406 provides one or more interfaces for communication (such as, for example, packet-based communication) between the computing device and one or more other computing devices 1400 or one or more networks. As an example and not by way of limitation, communication interface 1406 includes a network interface controller (NIC) or network adapter for communicating with an Ethernet or other wire-based network or a wireless NIC (WNIC) or wireless adapter for communicating with a wireless network, such as a WI-FI. The computing device 1400 further includes a bus 1412. The bus 1412 comprises hardware, software, or both that couples components of computing device 1400 to each other.

The computing device 1400 includes a storage device 1408 includes storage for storing data or instructions. As an example, and not by way of limitation, storage device 1408 comprises a non-transitory storage medium described above. The storage device 1408 includes a hard disk drive (HDD), flash memory, a Universal Serial Bus (USB) drive or a combination these or other storage devices.

The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 includes a mouse, keypad or a keyboard, a touch screen, camera, optical scanner, network interface, modem, other known I/O devices or a combination of such I/O devices/interfaces 1410. The touch screen is activated with a stylus or a finger.

The I/O devices/interfaces 1410 includes one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments take other specific forms without departing from its spirit or essential characteristics as understood by one of ordinary skill in the art. The described embodiments are to be considered in all respects only as illustrative and not restrictive. For example, in some embodiments the methods described herein are performed with less or more steps/acts or the steps/acts are performed in differing orders. Additionally, the steps/acts described herein are repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor is it to be understood to, imply that a given embodiment requires at least one of A, at least one of B, or at least one of C to each be present.

I claim:

1. A computer-implemented method comprising:
   receiving, by a user interface manager of a lens blur rendering system, a request to apply a lens blur effect to an image, the request identifying an input image, depth map, and focal plane in the input image;
   identifying, by a blur manager of the lens blur rendering system, an accumulation region of the input image corresponding to a first pixel of an output image, wherein the accumulation region is a region of source pixels of the input image centered on coordinates of the first pixel whose values contribute to an output pixel value of the first pixel;
   generating, by an iris map manager of the lens blur rendering system, an iris map including a plurality of iris blocks, wherein the iris map includes, for each source pixel, a threshold value for that source pixel to contribute to the output pixel value of the first pixel, and wherein the iris map manager identifies a minimum threshold value for each iris block of the plurality of iris blocks and stores the minimum threshold value for each iris block;
   determining, by the blur manager of the lens blur rendering system, a weight for each source pixel from the input image in the iris blocks of the accumulation region when a maximum effective blur radius is larger than the minimum threshold value of the iris block based on a comparison of the minimum threshold value of the iris block and a maximum effective blur radius for each iris block of the accumulation region; and
   generating, by the blur manager of the lens blur rendering system, an output pixel value for the first pixel by calculating a weighted sum of the source pixels from the accumulation region.

2. The computer-implemented method of claim 1, further comprising:
   iteratively generating, by the blur manager of the lens blur rendering system, an output pixel value of each pixel of the output image based on a corresponding accumulation region of the input image.

3. The computer-implemented method of claim 2, wherein iteratively generating, by the blur manager of the lens blur rendering system, an output pixel value of each pixel of the output image based on a corresponding accumulation region of the input image, further comprises:
   dividing the output image into a plurality of pixel blocks; and
   allocating a plurality of threadgroups of at least one processor to process the plurality of pixel blocks.

4. The computer-implemented method of claim 1, further comprising:
   generating, by the iris map manager of the lens blur rendering system, at least a portion of the iris map based on an iris shape parameter, wherein each iris block corresponds to a different portion of the accumulation region.

5. The computer-implemented method of claim 4, wherein generating, by the blur manager of the lens blur rendering system, an output pixel value for the first pixel by calculating a weighted sum of the source pixels from the accumulation region, further comprises:
   storing intermediate sums of source pixel weights; and
   storing intermediate output pixel values for each iris block as intermediate weighted averages comprising the intermediate output pixel value divided by an intermediate sum of source pixel weights for the iris block.

6. A system, comprising:
   a computing device implementing a lens blur rendering system, the computing device including at least one processor and a non-transitory computer readable storage medium including instructions stored thereon which, when executed by the at least one processor, cause the lens blur rendering system to:
   receive, by a user interface manager of the lens blur rendering system, a request to apply a lens blur effect to an image, the request identifying an input image, depth map, and focal plane in the input image;
   identify, by a blur manager of the lens blur rendering system, an accumulation region of the input image corresponding to a first pixel of an output image, wherein the accumulation region is a region of source pixels of the input image centered on coordinates of the first pixel whose values contribute to an output pixel value of the first pixel;

generate, by an iris map manager of the lens blur rendering system, an iris map including a plurality of iris blocks, wherein the iris map includes, for each source pixel, a threshold value for that source pixel to contribute to the output pixel value of the first pixel, and wherein the iris map manager identifies a minimum threshold value for each iris block of the plurality of iris blocks and stores the minimum threshold value for each iris block;

determine, by the blur manager of the lens blur rendering system, a weight for each source pixel from the input image in the iris blocks of the accumulation region when a maximum effective blur radius is larger than the minimum threshold value of the iris block based on a comparison of the minimum threshold value of the iris block and a maximum effective blur radius for each iris block of the accumulation region; and generate, by the blur manager of the lens blur rendering system, an output pixel value for the first pixel by calculating a weighted sum of the source pixels from the accumulation region.

7. The system of claim 6, wherein the instructions, when executed, further cause the lens blur rendering system to:

iteratively generate, by a blur manager of a lens blur rendering system, an output pixel value of each pixel of the output image based on a corresponding accumulation region of the input image.

8. The system of claim 7, wherein the instructions to iteratively generate, by the blur manager of a lens blur rendering system, an output pixel value of each pixel of the output image based on a corresponding accumulation region of the input image, when executed, further cause the lens blur rendering system to:

divide the output image into a plurality of pixel blocks; and allocate a plurality of threadgroups of at least one processor to process the plurality of pixel blocks.

9. The system of claim 6, wherein the instructions, when executed, further cause the lens blur rendering system to:

generate, by the iris map manager of the lens blur rendering system, at least a portion of the iris map based on an iris shape parameter, wherein each iris block corresponds to a different portion of the accumulation region.

10. The system of claim 9, wherein the instructions to generate, by the iris map manager of the lens blur rendering system, an output pixel value for the first pixel by calculating a weighted sum of the source pixels from the accumulation region, when executed, further cause the at least one processor to:

store intermediate sums of source pixel weights; and store intermediate output pixel values for each iris block as intermediate weighted averages comprising the intermediate output pixel value divided by an intermediate sum of source pixel weights for the iris block.

11. A system comprising:

means for receiving a request to apply a lens blur effect to an image, the request identifying an input image, depth map, and focal plane in the input image;

means for identifying an accumulation region of the input image corresponding to a first pixel of an output image, wherein the accumulation region is a region of source pixels of the input image centered on coordinates of the first pixel whose values contribute to an output pixel value of the first pixel;

means for generating an iris map including a plurality of iris blocks, wherein the iris map includes, for each source pixel, a threshold value for that source pixel to contribute to the output pixel value of the first pixel, and wherein the iris map manager identifies a minimum threshold value for each iris block of the plurality of iris blocks and stores the minimum threshold value for each iris block;

means for determining a weight for each source pixel from the input image in the iris blocks of the accumulation region when a maximum effective blur radius is larger than the minimum threshold value of the iris block based on a comparison of the minimum threshold value of the iris block and a maximum effective blur radius for each iris block of the accumulation region; and means for generating an output pixel value for the first pixel by calculating a weighted sum of the source pixels from the accumulation region.

12. The system of claim 11, further comprising:

means for iteratively generating an output pixel value of each pixel of the output image based on a corresponding accumulation region of the input image.

13. The system of claim 12, wherein the means for iteratively generating an output pixel value of each pixel of the output image based on a corresponding accumulation region of the input image, further comprises:

means for dividing the output image into a plurality of pixel blocks; and means for allocating a plurality of threadgroups of at least one processor to process the plurality of pixel blocks.

14. The system of claim 11, further comprising:

means for generating at least a portion of the iris map based on an iris shape parameter, wherein each iris block corresponds to a different portion of the accumulation region.

15. The system of claim 14, wherein the means for generating an output pixel value for the first pixel by calculating a weighted sum of the source pixels from the accumulation region, further comprises:

means for storing intermediate sums of source pixel weights; and means for storing intermediate output pixel values for each iris block as intermediate weighted averages comprising the intermediate output pixel value divided by an intermediate sum of source pixel weights for the iris block.

16. The system of claim 14, further comprising:

means for storing the minimum threshold value for each iris block; and wherein the means for determining a weight for the source pixels based at least in part on an iris map for the source pixels and a depth distance value between each of the source pixels and the focal plane, wherein the iris map includes, for each source pixel, a threshold value for that source pixel to contribute to the output pixel value of the first pixel, further comprises:

means for comparing the minimum threshold value of the iris block to a maximum effective blur radius for each iris block of the accumulation region; and means for determining the weight for each source pixel from the input image in iris blocks of the accumulation region when the maximum effective blur radius is larger than the minimum threshold value of the iris block.

* * * * *